United States Patent

[11] 3,558,820

[72] Inventors Gustaf A. Baisch;
James L. Eberle, Seattle, Wash.
[21] Appl. No. 735,447
[22] Filed June 7, 1968
[45] Patented Jan. 26, 1971
[73] Assignee The Boeing Company
Seattle, Wash.
a corporation of Delaware

[54] STENOGRAPHIC MACHINE AND SYSTEM
31 Claims, 45 Drawing Figs.

[52] U.S. Cl. .......... 178/17.5, 340/365
[51] Int. Cl. .......... H041 13/08
[50] Field of Search .......... 179/2, 2DP, 90K; 178/4.1, 17.5, 17A, 17C, 23, 30, 36; 340/365; 197/98—100

[56] References Cited
UNITED STATES PATENTS
2,938,952 5/1960 Roggenstein .......... 178/17(C)

*Primary Examiner*—Ralph D. Blakeslee
*Attorney*—Christensen, Sanborn & Matthews

ABSTRACT: An improved stenographic machine and system is disclosed, and more particularly a machine which enables a stenographer to provide substantially immediately a transcribed record of the information given orally to the stenographer. A novel stenographic keyboard assembly is disclosed which provides output data signals to the electronic data processing section of the system, which in turn controls a printer or similar output device. One specific embodiment of the invention is disclosed as a verbatim reporting machine wherein the operator is provided with a keyboard somewhat similar in size to a conventional keyboard of a typewriter but having a unique arrangement of a plurality of keys with redundancy of most letters in the alphabet being provided. Details of the electronic system for processing the keyboard signals are also disclosed.

A need has long existed for equipment which would permit the automatic preparation of a written record of the oral statements of individuals, as for example in the field of court reporting and elsewhere. While much effort has been devoted to solving the problem of going directly from spoken English to a written record thereof there presently exists no equipment which will automatically and accurately provide a typewritten record of all spoken words. Thus stenographers are presently used in all courts of record as well as in most industries for purposes of recording verbatim the conversations which transpire. In an attempt to reduce the problems associated with an individual utilizing a pencil for taking stenographic notes there have been developed a multiplicity of stenographic machines. Voice recording equipment is also in widespread usage for permitting the stenographer to type at his or her leisure the information contained on the sound recording. A major problem of this type of procedure is the long time delay associated with obtaining a written record of the oral proceedings.

A prime example of the drawback associated with presently available verbatim reporting systems is that associated with obtaining a transcript of the proceedings taking place in a courtroom. For example, if a court is in session from 8:00 a.m. to noon, it is presently impossible for the attorneys and the judge to have available for their use during the lunch period an accurate written record of all statements made during the morning. In the case of taking depositions as well as in the case of preparing verbatim reports of any given business meeting it is most inconvenient for the participants to be forced to wait as much as several days for the stenographer to transcribe the voluminous notes taken either by pencil or by stenographic machine.

Another area where machines of the type disclosed herein will find substantial use is in the field of recording in machine control format the contents of written data. With the present equipment a person can read data and operate the present equipment to thereby obtain the desired record at a speed which heretofore has not been possible.

INVENTORS.
GUSTAF A. BAISCH
JAMES L. EBERLE
BY
Christensen, Sanborn & Matthews
ATTORNEYS INVENTORS
GUSTAF A. BAISCH
JAMES L. EBERLE
BY
Christensen, Sanborn & Matthews
ATTORNEYS INVENTORS
GUSTAF A. BAISCH
JAMES L. EBERLE
BY
Christensen Sanborn & Matthews
ATTORNEYS INVENTORS.
GUSTAF A. BAISCH
JAMES L. EBERLE
BY
Christensen Sanborn & Matthews
ATTORNEYS INVENTORS
GUSTAF A. BAISCH
JAMES L. EBERLE
BY
Christensen, Sanborn & Matthews
ATTORNEYS INVENTORS
GUSTAF A. BAISCH
JAMES L. EBERLE
BY
Christensen, Sanborn & Matthews
ATTORNEYS INVENTORS.
GUSTAF A. BAISCH
JAMES L. EBERLE
BY
Christensen Sanborn & Matthews
ATTORNEYS

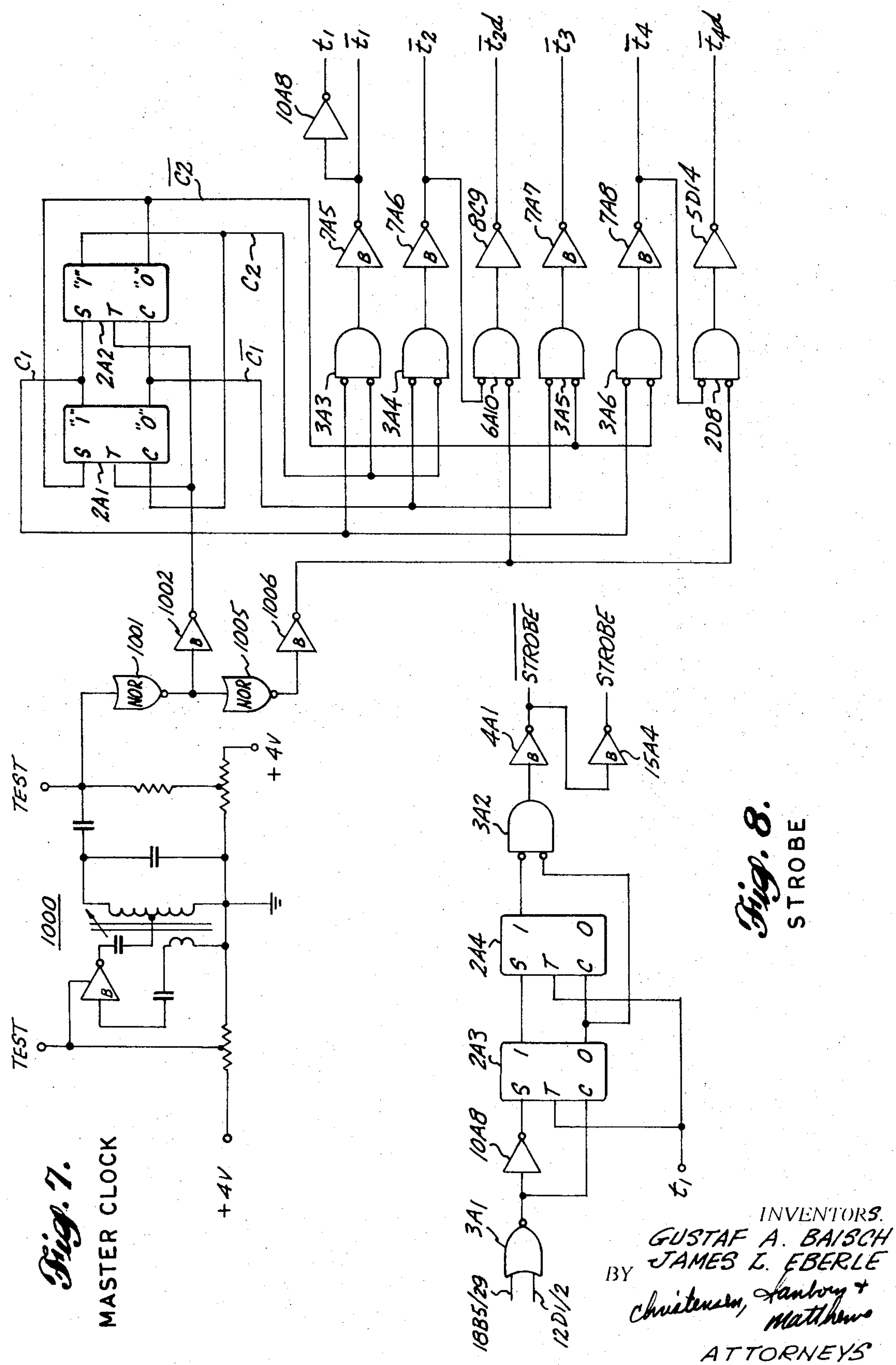
FIG. 7. MASTER CLOCK, FIG. 8. STROBE
INVENTORS.
GUSTAF A. BAISCH
JAMES L. EBERLE
BY Christensen, Sanborn & Matthews
ATTORNEYS INVENTORS
GUSTAF A. BAISCH
JAMES L. EBERLE
BY Christensen Sanborn & Matthews
ATTORNEYS

LOAD CONTROL

INVENTORS
GUSTAF A. BAISCH
JAMES L. EBERLE
BY Christensen Sanborn & Matthews
ATTORNEYS

CONTROL LOGIC

INVENTORS.
GUSTAF A. BAISCH
JAMES L. EBERLE
BY Christensen Sanborn & Matthews
ATTORNEYS INVENTORS.
GUSTAF A. BAISCH
JAMES L. EBERLE
BY
Christensen Sanborn & Matthews
ATTORNEYS

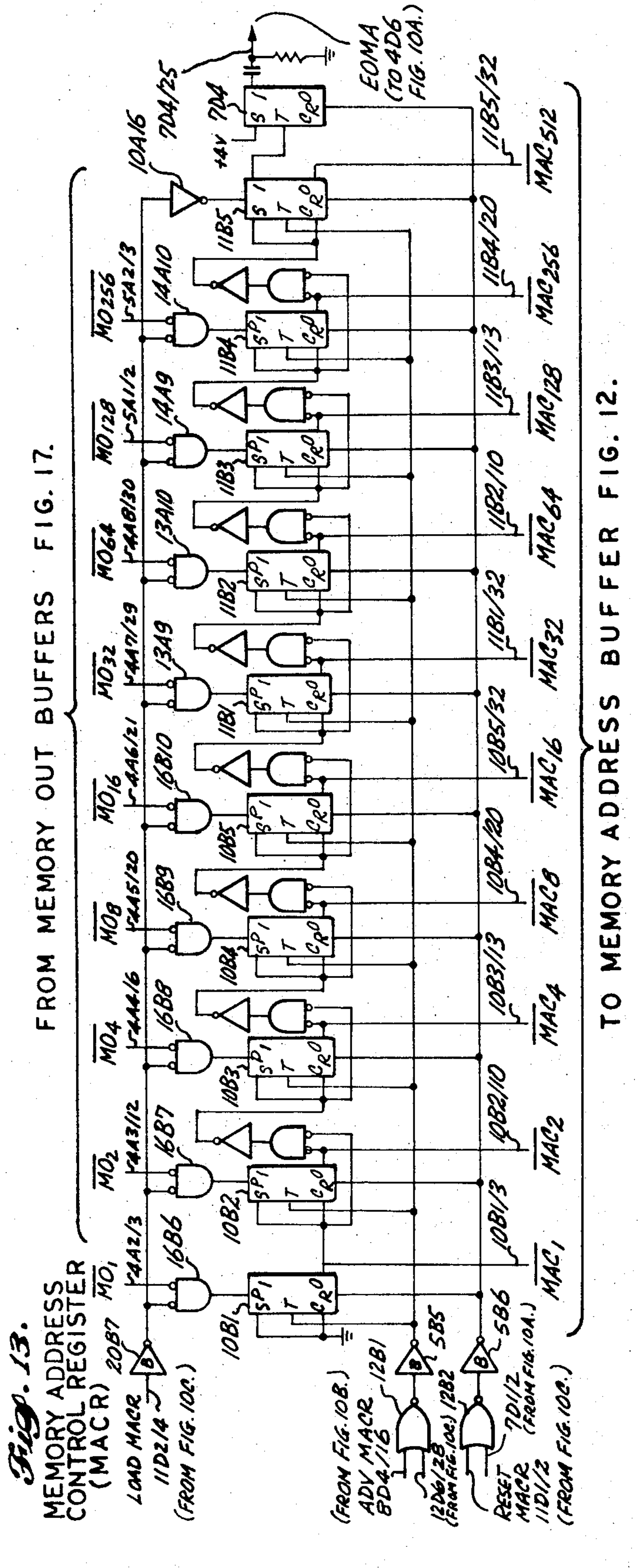
Fig. 13. MEMORY ADDRESS CONTROL REGISTER (MACR)
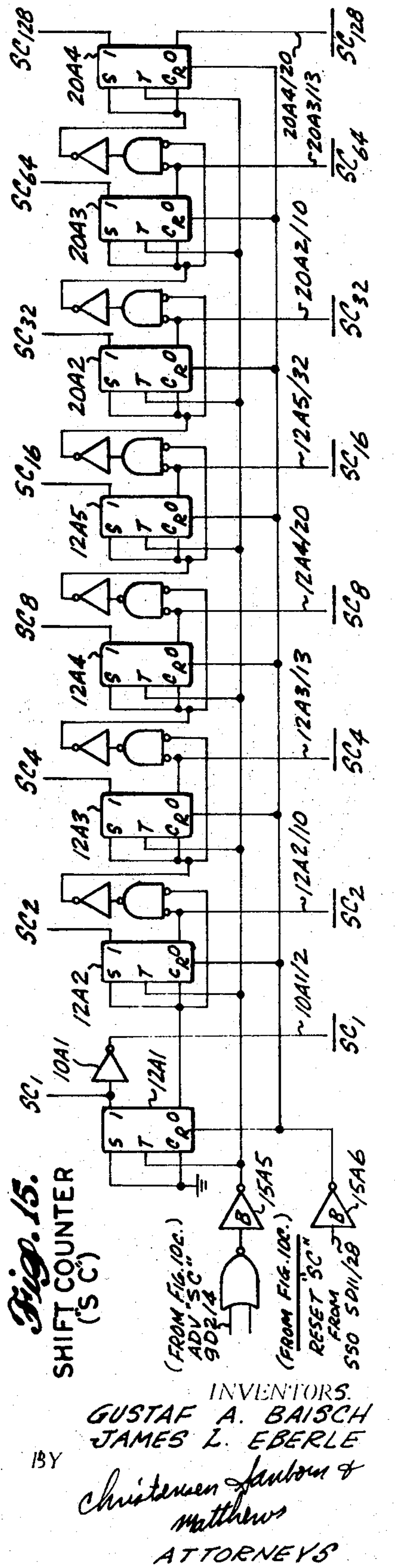
Fig. 15. SHIFT COUNTER ("SC")
INVENTORS.
GUSTAF A. BAISCH
JAMES L. EBERLE
BY Christensen Sanborn & Matthews
ATTORNEYS

MEMORY ADDRESS REGISTERS (MIAR AND MOAR)

INVENTORS.
GUSTAF A. BAISCH
BY JAMES L. EBERLE
Christensen Sanborn & Matthews
ATTORNEYS

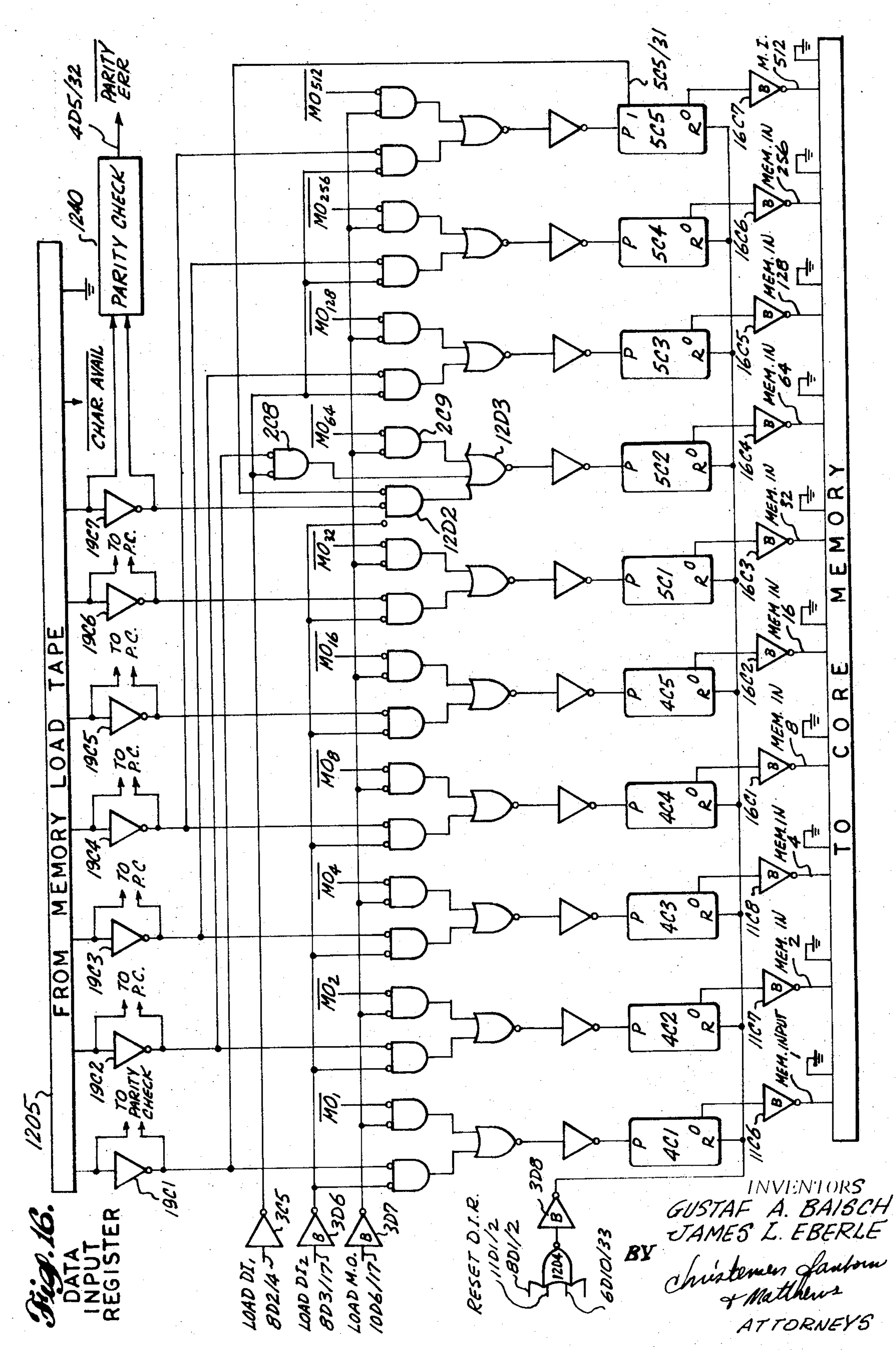
Fig. 16. DATA INPUT REGISTER
INVENTORS
GUSTAF A. BAISCH
JAMES L. EBERLE
BY Christensen, Sanborn & Matthews
ATTORNEYS

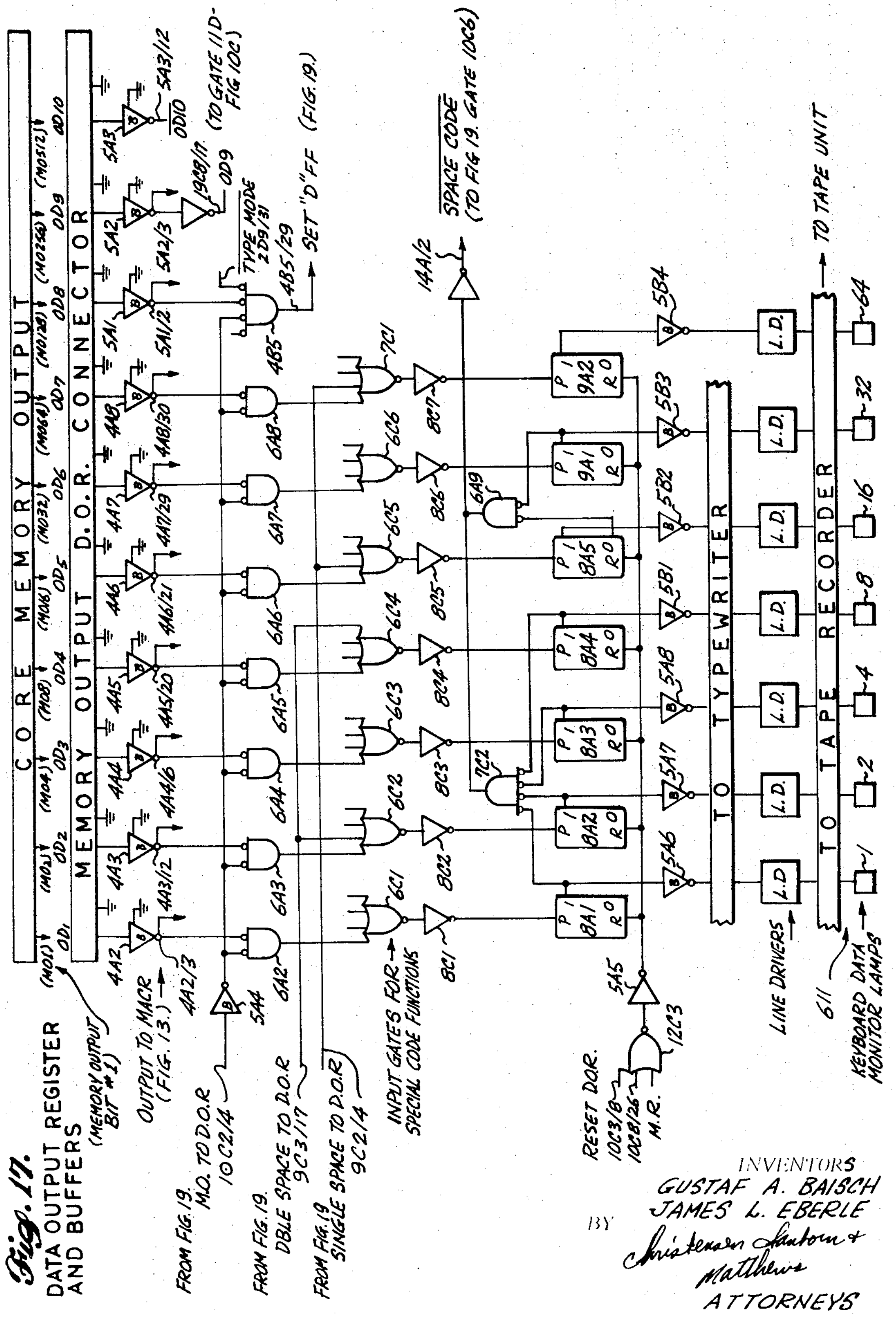
Fig. 17. DATA OUTPUT REGISTER AND BUFFERS
INVENTORS
GUSTAF A. BAISCH
JAMES L. EBERLE
BY Christensen Sanborn & Matthews
ATTORNEYS

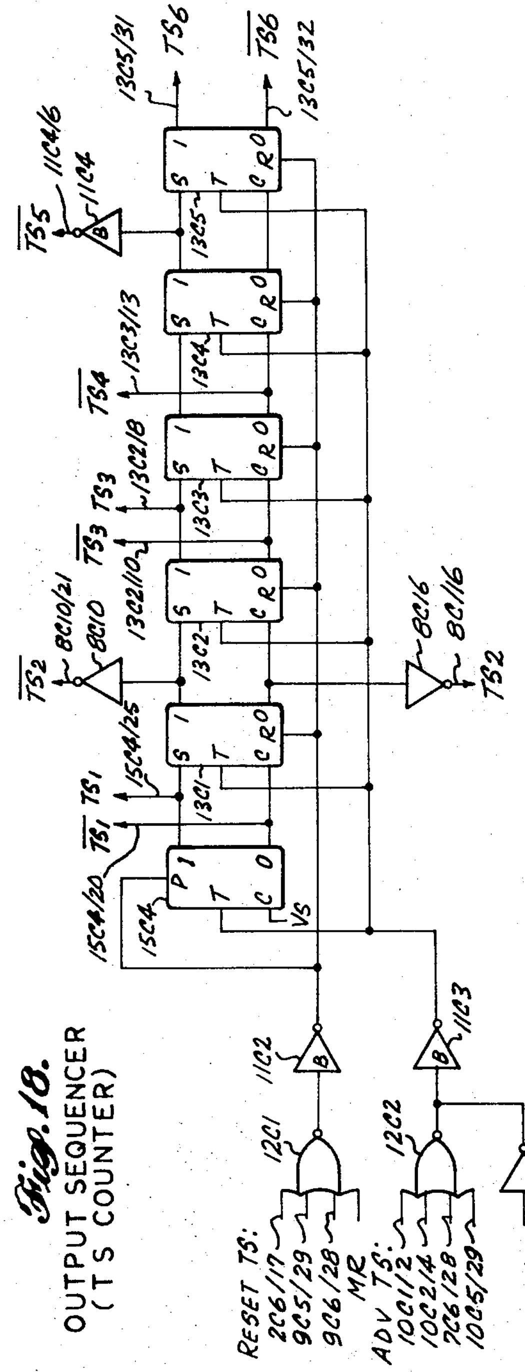
Fig. 18. OUTPUT SEQUENCER (T S COUNTER)
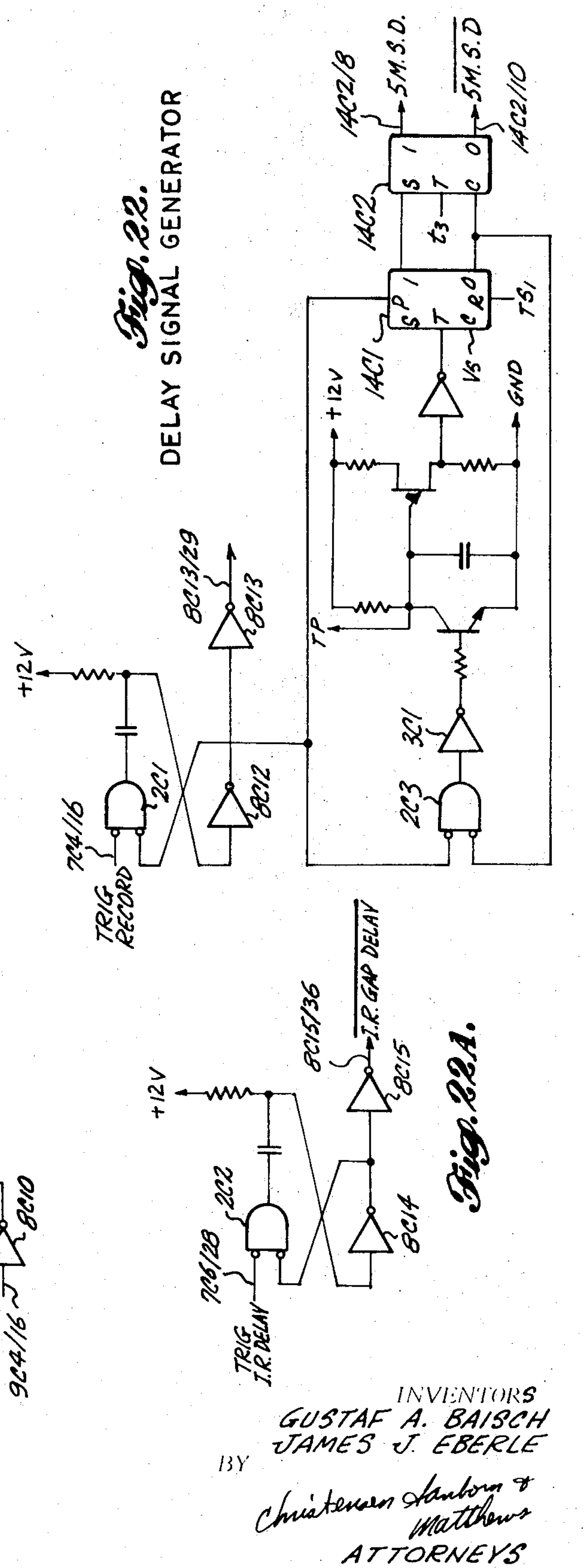
Fig. 22. DELAY SIGNAL GENERATOR, Fig. 22A.
INVENTORS
GUSTAF A. BAISCH
JAMES J. EBERLE
BY
Christensen Sanborn & Matthews
ATTORNEYS

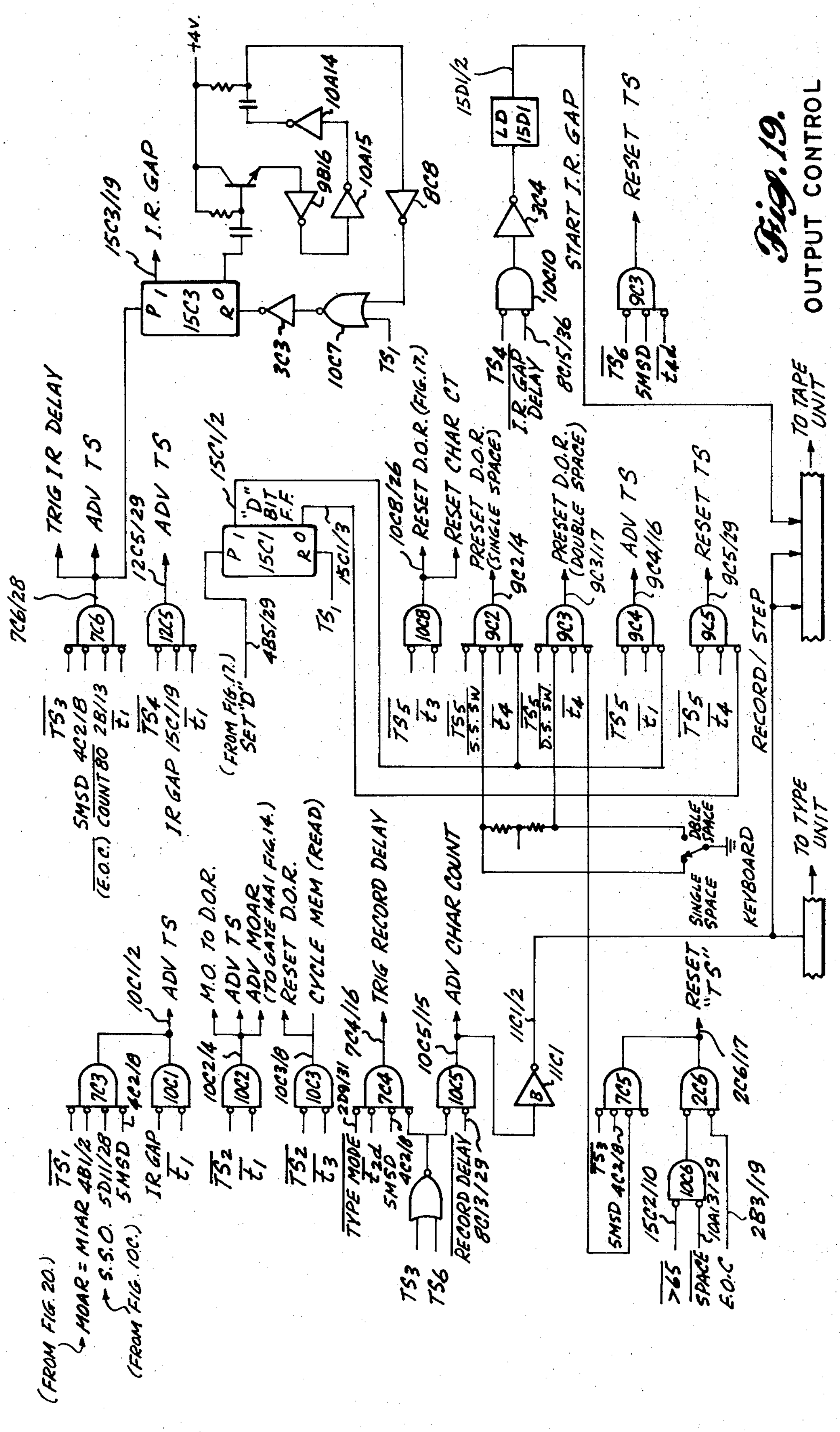
Fig. 19. OUTPUT CONTROL

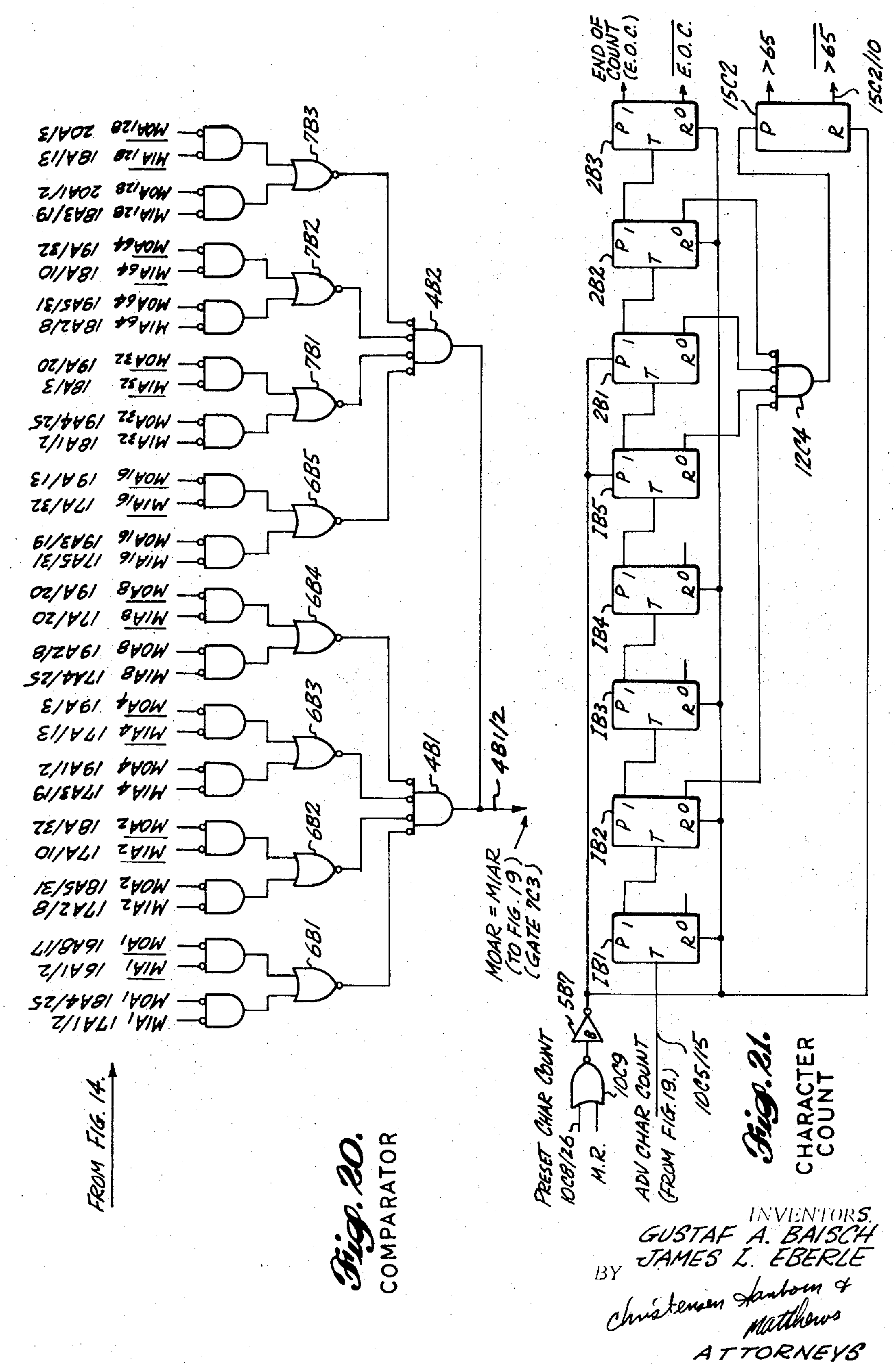
FIG. 20. COMPARATOR, FIG. 21. CHARACTER COUNT
INVENTORS.
GUSTAF A. BAISCH
JAMES L. EBERLE
BY
Christensen Sanborn & Matthews
ATTORNEYS

LOAD MODE TIMING

INVENTORS
GUSTAF A. BAISCH
JAMES L. EBERLE
BY Christensen Sanborn & Matthews
ATTORNEYS

PATENTED JAN 26 1971 3,558,820

TYPE MODE — SEARCH SHIFT TIMING

INVENTORS
GUSTAF A. BAISCH
JAMES L. EBERLE
BY Christensen Sanborn & Matthews
ATTORNEYS

CONTINUED ON FIG. 25 B.

OUTPUT TIMING CHAR COUNTS 0 THRU 65 "D" BIT FALSE

INVENTORS.
GUSTAF A. BAISCH
JAMES L. EBERLE
BY
Christensen Sanborn Matthews
ATTORNEYS

OUTPUT TIMING CHAR COUNTS 66 THRU 80 "D" BIT FALSE

INVENTORS.
GUSTAF A. BAISCH
JAMES L. EBERLE
BY Christensen Sanborn & Matthews
ATTORNEYS

OUTPUT TIMING FINISH LINE ROUTINE "D" BIT @ CHAR COUNT 30

INVENTORS
GUSTAF A. BAISCH
JAMES L. EBERLE
BY Christensen Sanborn & Matthews
ATTORNEYS

STENOGRAPHIC MACHINE AND SYSTEM

It is therefore an object of the present invention to provide a stenographic system wherein a transcribed written record is produced substantially simultaneously with the stenographer's operation of a stenographic keyboard input device.

Another object of the present invention is to provide a stenographic system wherein a machine control tape or other similar machine control record is produced in response to operation of the keys on a novel keyboard with the recorded controls being adapted to control the operation of data recording equipment such as a typewriter, a high speed printer, or other output device commonly used in the computing art.

Another object of the present invention is to provide a novel keyboard and signal output device associated therewith for providing output electric signals arranged in the proper sequence and representing complete words or portions of complete words in response to operation of one or a multiplicity of the keyboard keys in a parallel manner. Another object of the present invention is to provide a stenographic machine wherein selected words or parts thereof are preassembled in a storage unit and are selectively called therefrom and properly interlaced with other characters and words in response to the operation of a manual input keyboard. An additional object of the invention is to provide a system of the type disclosed above wherein the data output device operates nonsynchronously with respect to the operation of the keyboard input.

A further object of the invention is to provide a system wherein an operator can convert oral dictation to hard copy draft in real time. An additional object is to provide a man-machine interface for more rapidly inputting into any information processing or information handling system the desired control information.

The above and additional objects of the present invention are achieved by a system which includes a keyboard having a multiplicity of individually operable keys located thereon in a pattern such that when an operator depresses a multiplicity of the keys in parallel fashion for the phonetic formation of any word, the keyboard device will serve to provide a sequence of output signals having the desired characters or representations of a plurality of characters properly arranged for processing by the electronic data processing section of the system. The data processing section then operates on the keyboard output signals and serves to generate a string of coded data output signals arranged in proper order for controlling a high speed hard copy generating device such as a typewriter or high speed printer.

The keys are arranged in vertical rows with horizontal and vertical groupings of the individual keys being such that prefixes, beginning vowels, beginning consonants, numbers and symbols, ending consonants, ending vowels, and ending suffixes are provided. In addition, the keyboard includes intermediate redundant vowel (and consonant) keys located near the bottom center of the keyboard. Each key is assigned a number which is so related in a horizontal and vertical preferential sequence that when the operator forms a given word by the parallel operation of a plurality of keys making up the word, the keyboard assembly and associated switches incorporated therein will cause a selected sequence of keyboard output lines to be energized in a pattern determined by the horizontal and vertical preferential sequence assigned to the keys.

The output electric signals of the keyboard assembly are routed in the proper sequence to a memory unit which has recorded therein the information which in coded signal format represents the alpha or numeric character represented on the face of the operated keys. In the case of multiple character keys such as a prefix key or suffix key, the output signal from the keyboard associated with operation of such a key selects a given section of the memory so that the memory can be called upon to output a string of signals in proper sequence representative of the plurality of characters associated with the single key. The individual character signals and the multiple character signals are properly interlaced as a string of output signals from the memory so that the string of signals can be utilized for operating the data recording equipment in the output section of the system.

In the particular system disclosed for purposes of teaching the invention certain keys on the keyboard are also utilized to call from the memory a large number of words such as a stock paragraph which might be utilized repeatedly in a given proceeding. An example of this would be the introductory statements typically used by attorneys in the preparation of wills and also the typing of each individual's name preceding his statements during a deposition or court proceeding. This means that the operator is able to concentrate on recording the verbal data which is of critical importance without expending any substantial effort in being certain that the record will accurately show who made what statements.

A temporary output storage unit is disclosed as receiving the string of signals from the primary memory section. The properly assembled string of character signals are thus stored in proper sequence in the temporary output storage so that the output data recording equipment need not operate in synchronism with the operator's inputting of data via the keyboard. Details of a system wherein the string of character signals are recorded on a magnetic tape are disclosed with the tape thus produced then being utilized to control conventional data output devices such as high speed printers, typewriters, and any other selected data output device presently available and responsive to coded electronic signals. The result of the system disclosed is that a written record is produced by a stenographer which record is properly formatted and is produced at a speed which far exceeds the abilities of any known and presently available equipment for verbatim reporting.

The above as well as additional advantages and objects of the invention will be more clearly understood from the following description when read with reference to the accompanying drawings.

FIG. 7 is a schematic diagram of the master clock pulse generator.

FIG. 8 is a schematic diagram of the strobe signal generator.

FIG. 13 is a schematic diagram of the memory address control register.

FIG. 15 is a schematic diagram of the shift counter.

FIG. 17 is a schematic diagram of the data output register and buffer unit.

FIG. 18 is a schematic diagram of the sequence output timing circuit.

FIG. 19 is a schematic diagram of the output logic controls.

FIG. 20 is a schematic diagram of the comparator unit.

FIG. 21 is a schematic diagram of the character counter.

FIG. 22 is a schematic diagram of the delay signal generator and FIG. 22A is a schematic diagram of the interrecord gap delay circuit.

FIGS. 23, 24, 25A, 25B, and 26 are timing diagrams for the system shown in the detailed schematic diagrams of FIGS. 5—22.

As will be evident from the following description when read with reference to the drawings the invention is not limited to use as a verbatim transcription device in court reporting, conference reporting, etc. wherever "Stenotype" type machines are used, but is well suited as a system for feeding information to computers, higher speed Teletype input systems, and statistical file conversions such as encountered in the medical, insurance and related fields. However for purpose of disclosing the novel features a verbatim court reporter's model of the system is shown and described in detail.

Figure 1:
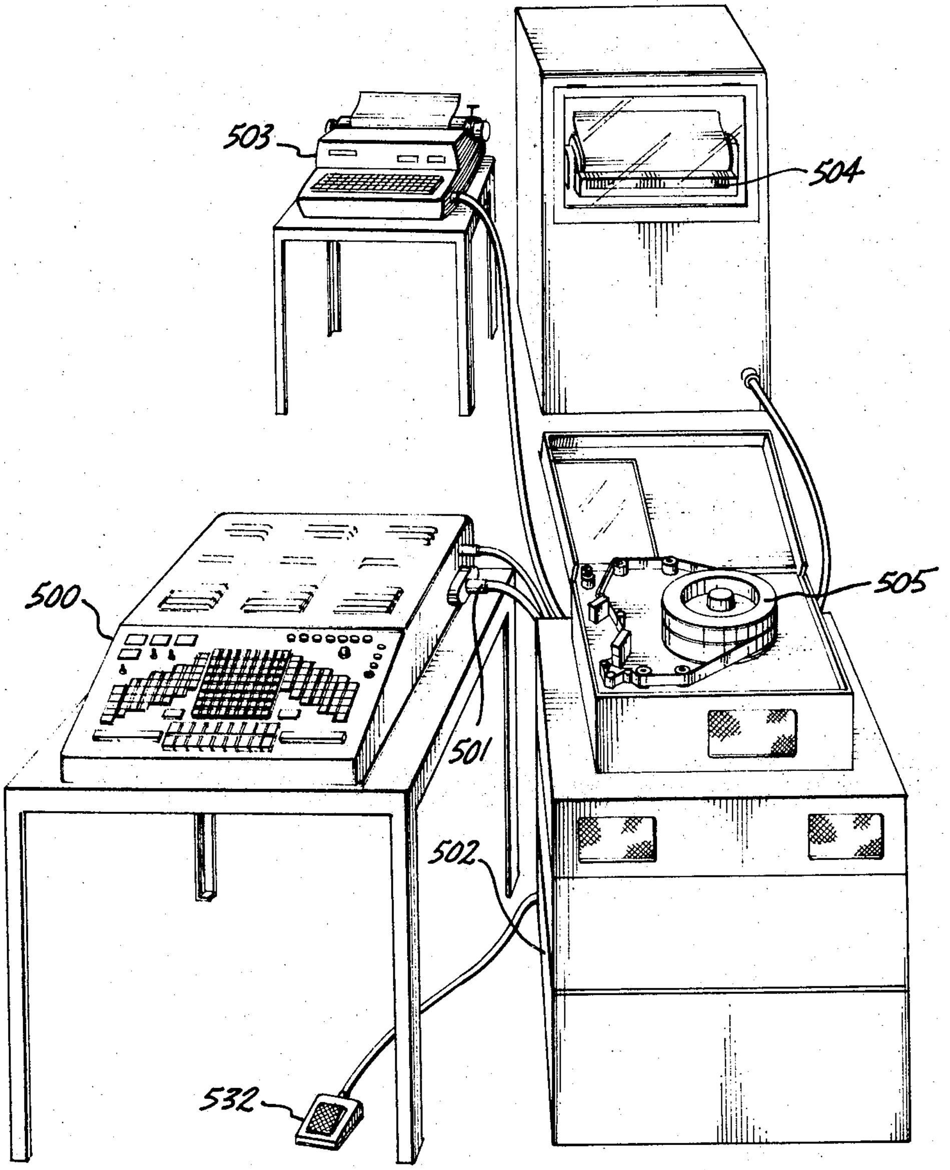
FIG. 1 is a perspective view of a verbatim reporting embodiment of the invention.

As seen in FIG. 1 the system includes three basic units which are conveniently cable connected for ease of interchange of various types of input and output devices and also to facilitate transportation and utilization of the equipment. Thus as shown in FIG. 1 a keyboard input unit 500 is coupled by the cable 501 to the electronic data processing and buffer assembly 502 which in turn provides properly formatted strings of output coded control signals for control of the output assembly shown as an electric typewriter 503 and/or a high speed printer 504. For purpose of teaching the generic concepts and many advantages of the invention the system of FIG. 1 includes a data recording device 505 illustrated as an incremental magnetic recorder.

One of the basic concepts behind the system is the ability of stenographers to formulate words using phonetic techniques with combinations of prefixes, consonants, vowels, and suffixes through the parallel depression of a plurality of individually operable keys. Thus as seen most clearly in FIG. 2 the system of FIG. 1 utilizes a keyboard having a large number of keys arranged in the general format illustrated in FIG. 2A. As seen in FIG. 2A wherein the general groupings of the various keys on the keyboard are labeled, the keyboard includes a first section of keys 520 which are labeled FIG. 2 and are numbered individually in FIG. 2B according to their numeric preference during keyboard readout. The keys 520 are used for identifying selected strings of words or names of individuals depending upon the specific programming of the data processing apparatus as described hereinafter. For example, in using the machine for recording conversations during a conference each of the keys in Group 520 is used to identify a specific individual at the conference. When the stenographer is recording the statements made by man No. 1, for example whose name might be Mr. Jones, he would merely operate key No. 1 in Group 520. As described hereinafter this would cause the output data equipment to type —JONES—. In practice it has been found advantageous for the stenographer to place on the table in front of each man at the conference a placard bearing a number corresponding to the keyboard key in Group 520 used to identify that individual. The system is then programmed for printing that man's name plus any selected punctuation in response to actuation of a single key.

Immediately adjacent to the key Group 520 is the Group 521 which includes word prefixes. As described hereinafter each of these keys is associated with a set of stored signals in the data processing section of the equipment with the sets of signals being arranged to be read from the memory section in the sequence indicated on the top of the prefix key in FIG. 2. Adjacent to the prefix keys 521 are the first set of vowel keys 522 followed by a group of consonant keys 523. It should be noted that the consonant keys 523 include not only one key for each consonant in the alphabet but also certain redundancy is provided. Thus there are two R keys, two M keys, two L keys and two P keys.

In the approximate center of the keyboard and adjacent to the columns of consonant keys 523 the numeric keys 524 are seen to be disposed above a group of symbol keys 525. The numeric keys 524 serve to provide output signals from the data processing section corresponding to the actual data shown on the key top.

Continuing to the right on the keyboard the next group is a second group of consonant keys 526 followed by a second group of vowel keys 527 and finally the suffix keys 528. The suffix keys 528 are like the prefix keys 521 in that the depression of a single key causes the output equipment to receive a string of signals in proper order for typing the data indicated on the key tops in FIG. 2 (excluding of course the small key identification numbers shown in FIG. 2B).

In the lower center of the keyboard a set of redundant vowel keys 529 are located. These are identified as redundant vowels in that it will be seen that each vowel is represented more than once with the letters I and O occurring three times each in the redundant vowel section. Also note that the redundant vowel section includes the quasi vowel Y.

It has been found through practice that it is most advantageous to provide the keyboard with left-hand and right-hand space bars 530 and 531 along the respective lower portions of the keyboard assembly. It has also been discovered that with the system of the present invention a foot-actuated space bar 532 permits a substantial increase in operator speed.

In the present system a stroke corresponds to the operator releasing all of the keys which have been depressed for forming a given word or string of words and symbols. In most instances the operator will have completed an entire word by the parallel depression of a plurality of keys with the stroke being completed (i.e., the data processing section of the system actuated) in response to release of the last one of the plurality of keys depressed for forming the word or words. Thus in most instances the operator would depress the space bar so that the electronic equipment processing the signals generated from the keyboard would automatically space the printing apparatus and hence be in condition for receipt of the next word. In this manner a space operation would be accomplished as the last operation of the stroke. In those cases where a given word is spelled through the use of a plurality of strokes the operator simply does not depress the space bar along with the parallel depression of the keys forming the first portion of the word. Thus when the second stroke is formed the characters resulting therefrom will be typed immediately adjacent to the first characters typed in response to the first stroke. Therefore the entire word would be generated by a plurality of strokes.

Since in the majority of cases the operator is ending a word with each stroke, it has been found more efficient to some operators to have the space signal occur automatically following each stroke unless overridden by depression of a "no space" bar. That is, it is found in practice that in most instances a stroke will end with a complete word and therefore a space operation should normally follow each stroke. Therefore by utilizing a "no space" bar it will be seen that the operator would depress the "no space" bar only in those cases where a word was being formed by a plurality of strokes. This important advantage has been found to reduce operator fatigue in that one less key is required to be depressed by the operator during the majority of stroke formations. Therefore the keyboard includes a "space bar reverse" switch 533 which serves to invert the function of the space bar. Thus an operator can select either of the two types of operation described above.

Figure 2:
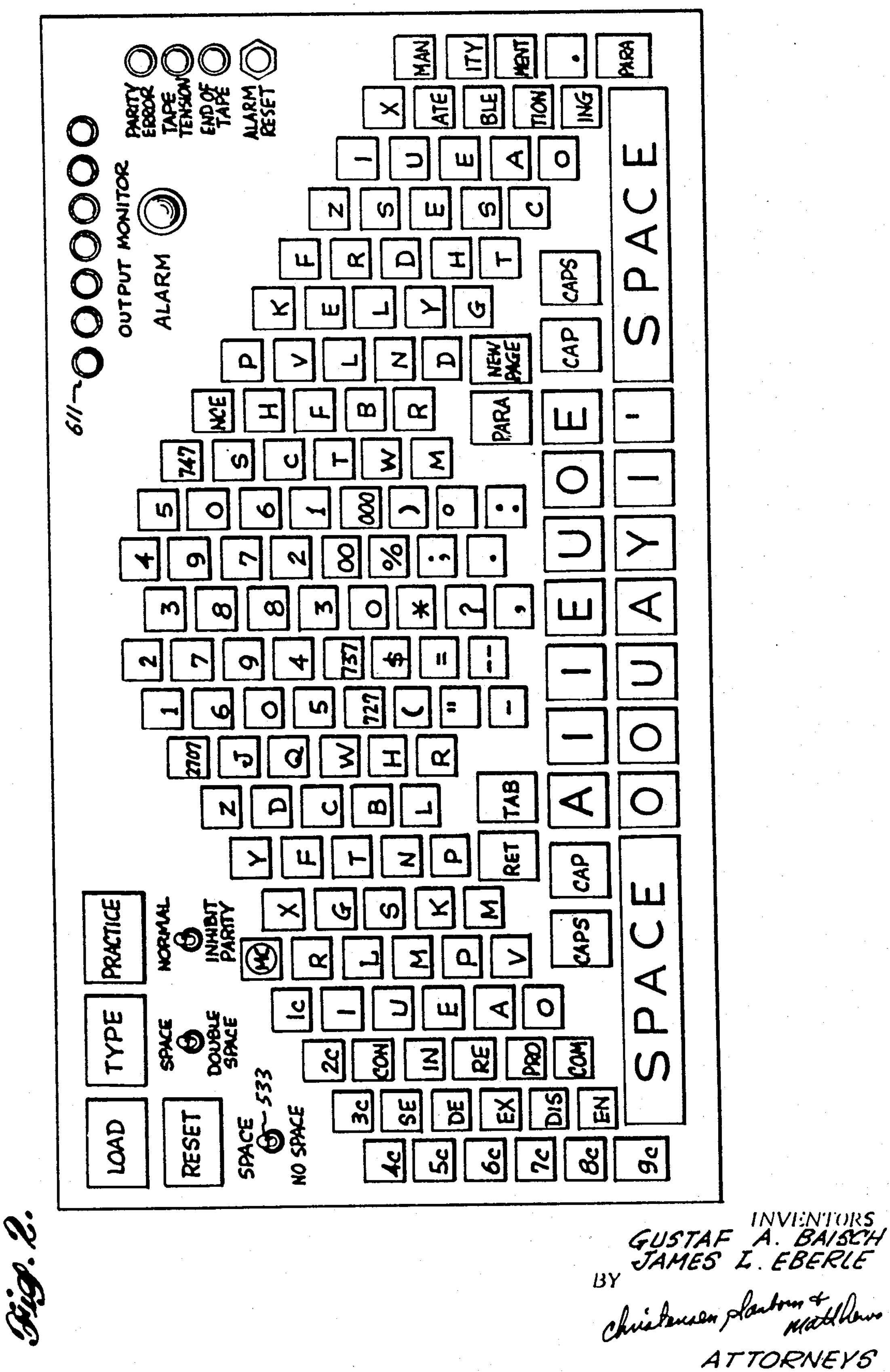
FIG. 2 is a detailed plan view illustrating a preferred embodiment of the arrangement of the keys on the keyboard input section of the stenographic system.
Figure 2A:
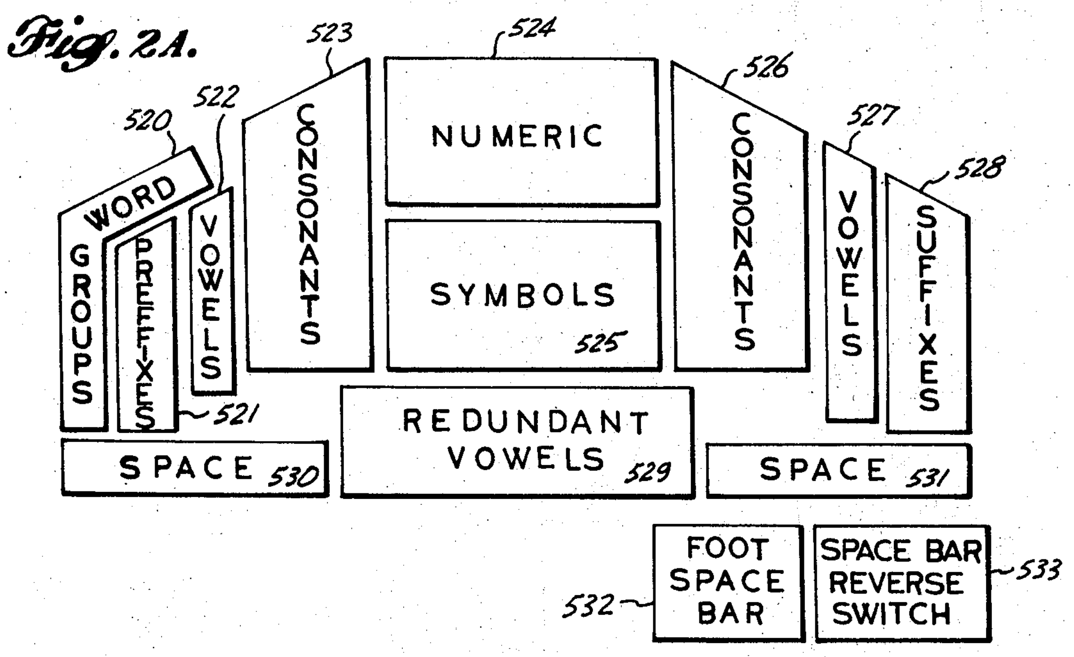
FIG. 2A is a diagram of the keyboard of FIG. 2 showing the manner in which the keys are grouped for ease of use by the operator.
Figure 2B:
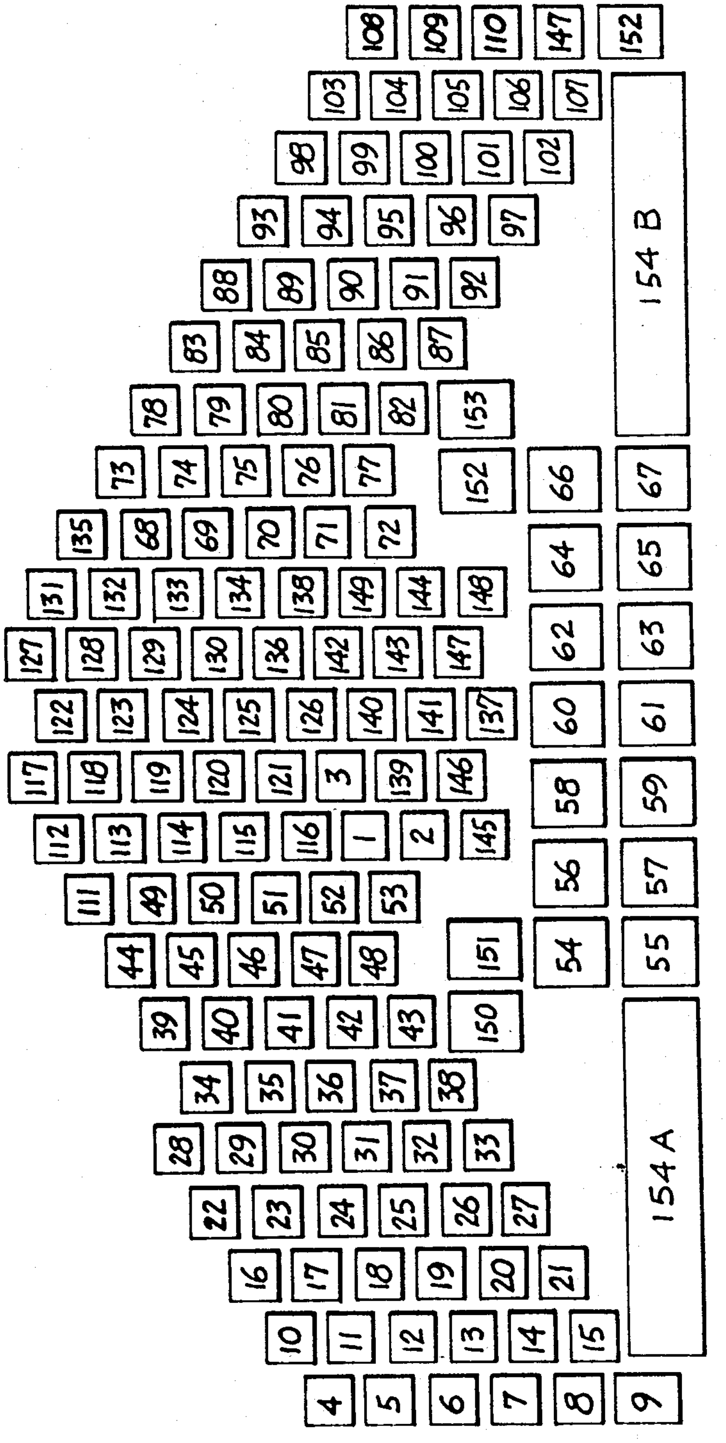
FIG. 2B is a keyboard plan view corresponding to FIG. 2 but having sequence numbers on the top of each key to illustrate the preferential sequence in which operated keys provide output data during keyboard readout.
Figure 2C:
FIG. 2C shows in detail an individual key.

In view of the redundancy of alpha and numeric keys on the keyboard, each individual key has been numbered in FIG. 2B so that reference can be made herein to a given key by such reference number. Also in practice it is found that by having the small identifying numbers embossed on the key heads as shown in FIG. 2C a new operator can readily determine which key has preference over any other key. Thus key No. 54 is the letter A as is key No. 61, 26, and 101. However if keys 26 and 30 were operated the machine would print AR whereas if keys 30 and 61 were operated RA would be printed. In the following description each key will be referred to by the small number appearing on the top thereof as shown in FIG. 2B.

Generically speaking the keyboard consists of N keys mounted in the indicated configuration which facilitates operator depression of a plurality of keys in parallel for formation of groups of words or letters. The keys need not be depressed simultaneously in that the only requirement for proper operation in forming a word or words is that once one key for forming a word or words has been depressed, all of the keys associated with such word or words for that stroke must be depressed before release of the last key in the stroke. The time during which these keys must be depressed is thus defined by the time between depression of the first key of the keys to be depressed and the time of release of the last key forming that stroke, as described in greater detail hereinafter. In the illustrated embodiment each key is connected to an independent switch 560 located beneath the keyboard and seen in FIG. 3. The set of switches beneath the keyboard therefore includes N switches and corresponds exactly to the number of keys. The switches act as the logical connection between the keyboard assembly and the electronic buffer unit.

As mentioned previously the operator inputs data in the general form of strokes. As used herein a stroke is defined as a parallel depression of one or more keys followed by release of those keys. In most cases the terminal stroke of a word includes the space bar as being one of the depressed keys in the stroke. Dealing with a verbatim reporting application the operator keys into the machine the corresponding characters relating exactly to the spoken word as he hears it. Each stroke is initiated by the depression of a key with each stroke being completed when the last key of the stroke is released. All of the keys relating to a given stroke need not be depressed at one time so long as one or more keys remain depressed during the total interval of the stroke. In addition to the alphameric character set and the multiple alphameric character functions incorporated in the keyboard and described in detail above, certain control features are provided. The specific controls desired can be readily incorporated, but for purpose of illustration the specific features of the embodiment illustrated include: return, which results in a new line being called for; tab, which provides five spaces; paragraph, which calls for a new line and ten space indentation; and new page, which calls for a new page and a start of a line at the top of the new page. The indicated controls are adapted for using the output on a conventional line printer.

As noted in the detailed illustration of the preferred keyboard in FIG. 2, each key on the keyboard has a logical number associated with it. During a stroke period the alphameric or symbol function or functions associated with a given key are aligned in proper order in the output according to the number associated with that key. For example, if keys 54, 55 and 56 were depressed and released during a given stroke, they would cause in the output from the keyboard a signal representation calling for the letters A O I in that order. When a word or a logical group of characters cannot be conveniently represented by a single stroke due to any given reason (as for example by an extremely long word or number of words), then more than one stroke is used in forming the necessary combination of characters. In that event the operator would not depress the space bar during the first stroke but would depress the space bar during formation of the final stroke. In the case of words in a text format the space bar is depressed with the last control associated with each word.

Certain other controls are provided to the operator in connection with operation of the tape transport unit, including an end of file marker switch. A main power switch is located on the power supply unit. Other controls at the keyboard console include a master reset with combined indicating lamp, a single space double space selector, a switch inhibiting parity check during the load operation, an alarm reset switch, and the following mode switches: Practice, Load, and Type. The mode switches consist of a combination switch and indication lamp. The console panel also includes lights for indicating the output data code, a flashing alarm and the following warning status lights: parity error, tape tension, and end of tape. The parity error is used to sense errors from the parity check circuitry during loading of a program into core memory as well as the echo check errors from the tape unit when operating in the Type mode.

The hardware section will be discussed in logical groups according to operational function. The front end consists of the parallel storage and transfer logic associated with the stroke monitor and stroke transfer sequencer and the search sequence register and its input control logic. This part of the logical mechanism is included as a part of the keyboard console assembly. This point was chosen as a logical interface point because of the minimal interconnecting cabling.

For the purposes of this description, the number of switch modules associated with corresponding keys on the keyboard will be assumed to be 156. However, it is understood that this number is of arbitrary length and is not restricted to any specific length. The switch 560 associated with each key module has an output line 561 which goes to the key switch buffer shown as K register 562. The switch output signals are thus immediately buffered by an associated inverter in the register 562. Each order of the K register may be a flip-flop which in turn drives the set input of the temporary storage "T" register 564. The output lines 563 of the K register also feed a high fan-in OR gate 565 associated with the stroke monitor 566. As any flip-flop in the K register 562 is set high due to the depression of the corresponding switch, the set is passed on the correspondingly numbered flip-flop in the T register. When the key switch is released the K register resets. However, as the switches are released the corresponding stage in the T register will remain set. It is of importance to note that the output lines 561 from the keyboard are arranged in straight line sequence with the lines indicated as 561-1, 561-2, —561-156. The number after the dash (-) indicates the number of the key associated with each line (i.e., corresponding to the number of FIG. 2B).

The stroke monitor input OR gate 565, which in this case has a fan-in of 156, senses the beginning of a stroke when any input to the T register goes high. A stroke termination is then determined when no input is high or when the last input which was high goes low. At this time a stroke transfer sequence is initiated pending a go status line is ready from the search shift register sequence and control logic unit 567. The stroke transfer sequence occurs when AND gate 568 provides an open signal on line 569 to the transfer gates 570. This causes transfer of the set status of the key switches as stored in the T register via the transfer gate array 570 into the search shift register or "S" register 571 which is a 156 bit register comprised of JK flip-flops arranged in a serial shift, parallel load, configuration. On completion of the stroke transfer sequence, a signal on status line 566A from the stroke monitor 566 to the search shift register sequence and logic control 572 serves to indicate a stroke pattern is ready. The stroke transfer sequence is completed by the search shift register control 572 resetting the T register after the transfer has been made.

The major portion of the electronic buffer logic and controls are contained in the electronic coupler assembly case seen in FIG. 1. The search shift register sequencer and control 572 is coupled by lines 572A to the memory control 573 and accomplishes the unloading and control coding for loading of the memory system. When the search shift register (SSR) loaded and ready level is transferred from the stroke transfer sequencer 567 to the search shift register sequencer and control 572 via line 567A, assuming that no other priority mode is in process, the search shift register sequence will be initiated. Clock pulses of the prime oscillator frequency, approximately 1 megacycle in one system, are directed from the clock pulse generator 574 to both the S register and the shift counter 575 in parallel. Thus, the output line 574A from the CP generator 574 goes to gate 576 which is opened by SSR control 572 to permit clock pulse signals to be applied via lines 576A and 576B to the SSR and to the shift counter. The state of each stage of the S register prior to parallel loading is established at the reset condition by control line 577. As described above, any stage of the SSR 571 whose corresponding key was depressed during the stroke will have been set during the stroke transfer sequence. The terminal bit of the S register is effectively examined after the shift pulse has completed the shift of that register. To this end the output line 571A from S register 571 is applied to control the parallel input gate 580 coupled to output lines 575A of counter 575. As the shift of register S takes place, the shift counter is being incremented one count. Therefore when the ID bit indicates a set condition on that stage of the S register, the corresponding count from the shift counter is, in effect, a binary code representing the key function intended during the stroke initiation. Line 571B from the S register serves as an input to the SSR control 572 so that SSR control 572 will close gate 576 and temporarily interrupt further shifting of the SSR 571 and counting of counter 575 when a "true" ID bit occurs in the monitored stage of register 571. The shift pulse is temporarily interrupted at this time. The shift count code of counter 575 is then used to define the eight least significant bits of the zone A memory address and a read/restore cycle is initiated in memory zone A.

The system design concept is such that the keyboard output is of a programmable nature allowing for arbitrary assignment of functions related to each key. A single alphameric or special symbolic character can be assigned to each function, or any combination of alphameric characters can be assigned within the following limits related to a given memory size. For purposes of this discussion, a memory configuration of 1,024 ten-bit words will be considered. Larger memories obviously can be used to allow more flexibility. With this memory size configuration the total key representation (i.e., the quantity "N" above) can be 256. The total combination or count of characters contained in keys with more than one character or symbol in the specific system described was chosen to be a maximum composite (cumulative) quantity of 512. That is, the total possible number of characters to be selected by the multiple character keys, such as the name, prefix, and suffix keys, was selected to be 512.

The memory in the present embodiment is shown as a core memory and is divided into three major zones...zone A, zone B, and zone C. Zone A is the character store for single character functions. The eight least significant bits of address to access zone A are in general derived from the shift counter section of the SSR sequencer. The ten-bit word is divided as follows for identification purposes and for reference herein. The least significant bit is defined as the units order with designation being as follows starting with one and increasing toward the more significant. One; two; four; eight; A; B; P or C for the seventh; eight being D; E, nine, and F as ten. When a key function represents a single alphameric or symbolic code, that specific code in BCD (binary coded decimal) format is stored in the seven least significant locations for the corresponding address of zone A including parity. If a key represents a multiple character set, meaning an expression containing more than one character, then the appropriate address in zone A is an indirect address to zone C. In the case of a multiple character set, the word as extracted from zone A in the manner described below during the read/restore cycle will consist of representations of one, two, four, eight, A, B, C, D, E, F. Note that although an eight-bit access address is used for zone A, the memory locations in the illustrated memory are each ten-bit parallel stores. When the location of memory zone A corresponding to any given key is addressed, the resultant output ten-bit word read from the selected word location of zone A is monitored to determine whether or not the "F" bit is TRUE or FALSE (i.e., 1 or 0). If it is a 1 this indicates a multiple character set and the least significant nine bits define an address for accessing a specific section of memory zone C. If the F bit in a word read from zone A is 0 then that word itself represents a single character corresponding to a given key on the keyboard (both the E and F bits are "0" in the single character words read from zone A).

Zone B is used for the output character string store, and like zone A is shown as capable of storing 256 words. In zone B the F bit included always zero and the next most significant bit, E, is always one. The eighth least significant bit in zone B (the D bit) comprises the interlaced address to zone B. Control of zone B is in general exercised by two sequentially interlaced address registers shown as the message input and message output registers 590 and 591. The message input register 590 normally leads the message output register 591.

Zone C consists of 512 words each of ten bits with the most significant bit F of the address code always being one. Zone C is the multiple character set store with access to zone C being derived from the address configuration word read from zone A and identified at the output of zone A due to an F bit being marked as a one. The E bit (the bit next to the most significant bit) in zone C marks a continuation (described below) and thus any word as pulled from zone C having a 1 in the E location will serve to indicate a continuation of readout from zone C for additional characters.

Figure 3:
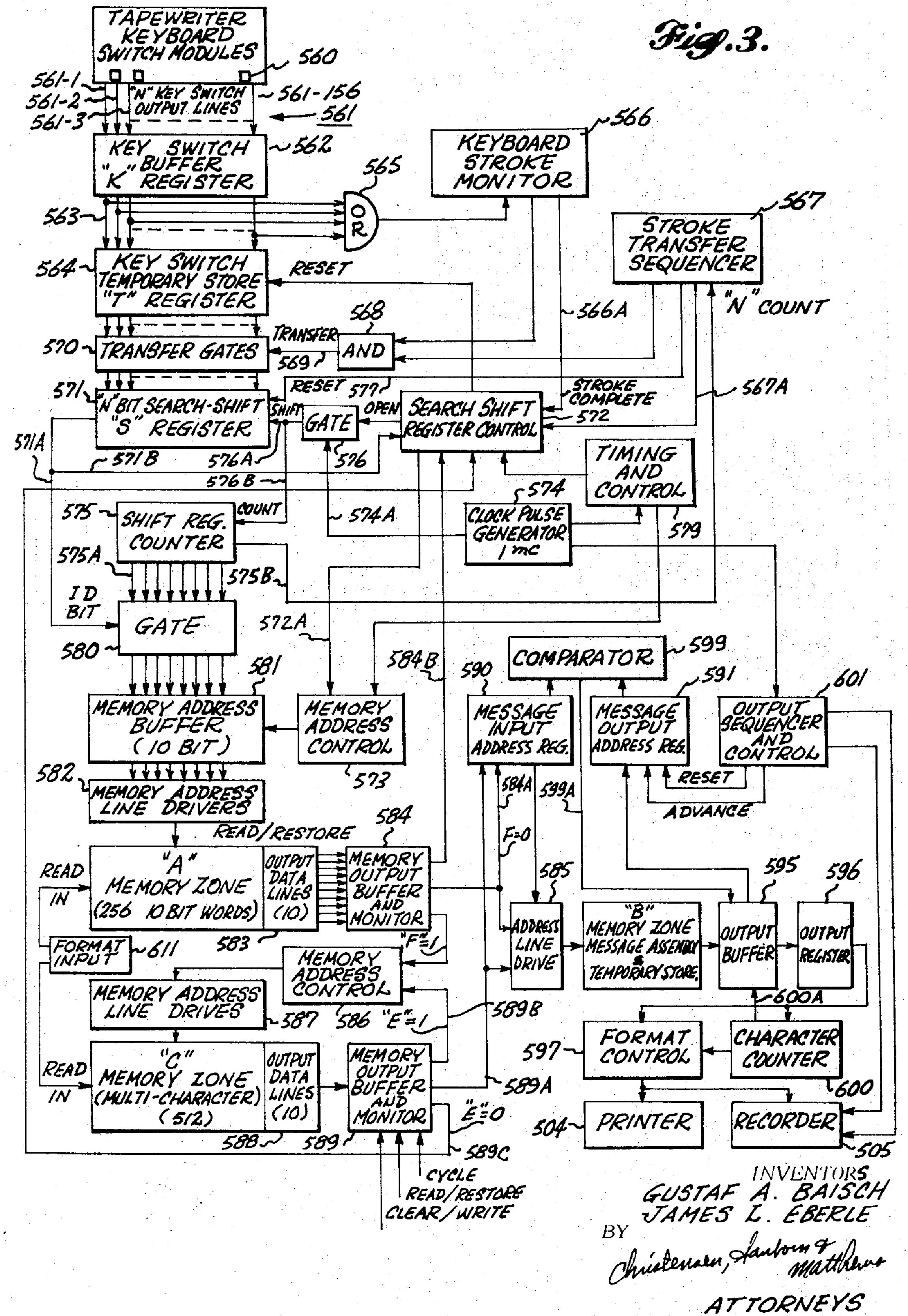
FIG. 3 is a block diagram of the various components connected in accordance with one preferred embodiment of the invention.

While various memory units presently readily available on the market can be used to carry out the inventive concepts disclosed herein, it is found that using a single memory divided into three sections as shown in FIG. 3 results in a relatively low cost arrangement. It has also been found that the invention can be carried out using the core memory and drivers sold by Decision Control Inc. of Newport, Calif. Since such memory units and their manner of operation, as well as the drive circuitry associated therewith are per se well known and understood, a detailed description thereof will not be given.

Turning now to the operation of the system as shown in FIG. 3 and discussed briefly above, the memory address control 573 effectively controls the memory address buffer 581 which is shown as a ten-bit buffer unit. While the address buffer 581 requires only eight bits to address section A, the particular memory unit used in the illustrated equipment and referred to above uses common buffer and line drive units for all three sections of the memory and thus a ten-unit buffer is shown.

When a marker bit is found in the search shift register 571 the resulting signal on line 571A opens gate 580 and the shift register counter 575 provides control signals to the memory address buffer 581 for addressing memory zone A. The address line drivers 582 under control of the timing and control unit 579 via the SSR control 572 then operate to extract a selected word from the A zone memory by causing a read/restore cycle. The word read from the selected position in the A zone is a ten-bit word which is provided on the output data lines 583 for the data register of the memory output buffer and monitor 584. If the F bit in the word read into the data register of the output buffer and monitor 584 is a zero, the seven least significant bits are transferred directly to zone B of the memory as a single character function. The message input address register 590 associated with memory zone B is effectively a binary counter which serves to control the address line drivers 585 for reading the word from memory zone A into a selected position in memory zone B.

If the F bit of the word read from the A memory zone is a one, the bits of that word in the data register of the output buffer and monitor 584 as extracted from zone A are used as the address to a selected portion of zone C for extraction of a multiple character set string. The memory address control 586 which is coupled to the buffer and monitor 584, together with the memory address line drivers 587 for the C memory zone, serve to cause a first read/restore cycle in memory zone C in response to the F bit in the word of the memory output buffer and monitor 584 being 1. The first word then read from the memory zone is applied by output data lines 588 to the C zone memory output buffer and monitor 589 which in turn applies the seven least significant bits as obtained from the read/restore cycle over lines 589A to zone B for storage in the next sequential address as defined by the message input address register 590. This read-in of data to the B zone occurs in a manner similar to the described operation for storing single characters from zone A in zone B. The lines 589A therefore are coupled with the zone C line drivers 585 as well as to the message input address register 590 for incrementing the count (or address) of the register 590.

If the E bit of the word read from the C memory zone is a 1 the memory address control 586 responds to this condition to cause the address register relating to zone C to be incremented by one count and cause a further read/restore cycle to be accomplished. Thus, another word will be read from the C memory zone with the least significant seven bits being transferred to memory zone B as a single character code in the manner described above. This sequence continues until such time as a zero is located in the E bit of the word being extracted from the C zone. During this time the further shifting of the shift register 571 is held in abeyance. The occurrence of a O in the E bit location of the words read from the C zone indicates that the last character of the multiple character set is being transferred to the B zone and therefore after such transfer has taken place the search shift register sequence should continue. Thus when the E bit O is detected a signal on the line 589C extending from the memory output buffer and monitor 589 to the search shift register control 572 serves to reinitiate operation of the search shift register. In a similar manner the line 584B from the memory output buffer and monitor 584 to the search shift register control 572 serves to reactivate the search shift register after the single character from the A zone memory has been read into the B zone.

It will be seen from the above that the depression of a key representing a single character causes binary signals representing that character to be read in parallel directly from the A memory zone into the B memory zone. It will also be seen that when a plurality of individual single characters are to be read from the A zone into the B zone due to operation of a plurality of single character keys for a single keyboard stroke the order of reading the single characters into the B zone will be controlled in accordance with the relative magnitude of the number of the operated keys (as indicated on the key tops in FIG. 2B). In the system illustrated the sequence is such that lowest numbered keys are read first. Thus the system operates to properly assemble the individual characters in accordance with the proper key groupings of the operator during formation of a stroke. In the case where the operator depresses one or more of the keys representing a multiplicity of characters (as for example a prefix or a suffix key) as part of a stroke, it will be seen that the address from the shift counter 575 to the memory zone A causes the resultant word pulled from the memory zone A to act as the access address for the C zone. The C zone then goes through a plurality of read/restore cycles with the required individual characters being read from the C zone into the B zone in proper sequence and assembled in proper order for causing the B zone to contain the properly formatted combination of individual characters. It will be seen that the assembly in the B zone will be correct regardless of whether the operator has depressed prefix, suffix, or individual character keys. Thus the specific desired sequence of characters is stored in the B zone during the search shift register sequence.

When the search shift register has been exhausted, or when its length N has been shifted completely clear a count code from the counter 575 corresponding to this condition will indicate via line 575B that the end of the search shift register sequence has been reached. The signal thus applied to the stroke transfer sequencer serves as a ready and relinquish priority to other sequences for data output purposes. The search shift register sequence has top priority and once the search shift operation has begun it cannot be stopped by any other operation (other than of course by the short time delays or interrogations described above during multiple character reading from zone C). However it should also be pointed out that other operations may occur simultaneously with the processing of a stroke in the above manner. Thus further operation of the keyboard can occur since the K register can be loaded with the next sequence during the time that the previous data is being processed and assembled in the B memory zone. Due to the high speed operation of the system even when using a one megacycle clock pulse rate it will be seen that the operator will in no way be constrained against operating at his peak speed.

Since the B memory zone after the above described operations contains a string of properly formatted characters, it will be seen that the only thing which remains is to read the assembled data from the B zone into an output register. The output signals from the B zone can then be used for immediate and direct control of printing apparatus such as a typewriter or high speed printer, or for recording for later control of such printing apparatus. The manner in which such binary coded signals from the B zone control the printing equipment is of course well known in the art.

The B memory zone is shown as being coupled by the output buffer unit 595 to the output register 596 which in turn applies signals via the format and control unit 597 to a recorded 505 and/or to a conventional data printout device such as a high speed printer or a typewriter. One of the advantages of the illustrated arrangement is that the B section of the memory can be providing output signals to the recorder and/or the printer while the search/shift operation is taking place. In the illustrated embodiment the B zone is capable of holding 256 characters and thus can store an average of 50 strokes. This capacity avoids problems associated with crowding of the stroke transfer sequence or overlap of strokes, has been found to minimize the possibility of machine error due to crowding of strokes, and allows driving of nonsynchronous interface devices on a time-share basis.

The B memory zone is operated effectively as a push-through store and thus the B zone is provided with a message output address register 591 coupled with the output buffer 595 and also to a comparator 599. The comparator 599 is also coupled with the message input address register 590 for the B zone memory. In operation the information is read out of the B zone of the memory with the comparator 599 continuously comparing the active address location of the message input address register 590 with that of the message output address register 591 (these two address registers being essentially binary counters). As the message output address register sequentially increases its count for sequentially reading data from the B memory zone the count or address of the register 591 will be incremented. So long as the condition or count in the two registers 590 and 591 are not identical the message output address register will continue to upcount and data will be read from the B zone memory. When the two registers reach coincidence the comparator 599 provides an output signal on line 599A and further data output from the B memory zone is prevented. Thus, it will be seen that the readin and readout of data to and from the B memory zone can take place at different rates with the output address register effectively trying to catch up with the input address register and with the output of data being stopped when the two registers reach coincidence. Data is read into the B zone on a "clear-write" cycle basis with the input address being incremented to the B zone capacity and then recycled for sequential use of all storage locations. Thus it will be seen that the particular memory location in the B zone used for storing any given character is immaterial in that wherever the first character of a given message is stored in the B zone the succeeding characters will be sequentially stored in adjacent memory locations with a continuous cycling of the entire memory taking place in response to the continued input of character signals from either the A or the C zones of the memory. The message output operation continues in a substantially continuous mode while the input of data to the B zone is basically on an intermittent basis due to the high speed capabilities of the data processing circuitry as compared to the relatively low speed of the human factor on the input to the keyboard. Therefore, it has been found that 256 "word" (or character) storage locations in the B zone is adequate to prevent any problem in the output of data even in the case of an extremely fast operator.

It will of course be obvious to persons skilled in this art that various types of memory devices and individual controls therefor can be utilized for carrying out the concepts disclosed in the system of FIG. 3. If cost were not a factor it would be immediately obvious that totally separate memory units could be utilized for storing the individual characters, the multiple character strings, and for storing the assembled output data prior to readout to the actual printing equipment. However, the system illustrated in FIG. 4 has the advantage of utilizing common address and line driver circuits for the various memory zones. Thus, a memory unit of the core type mentioned above was found to be completely adequate for the typing capabilities of a single input unit. It is obvious that the system lends itself well to multiplexing techniques for the utilization of plural inputs. In those applications larger memory units as well as parallel processing capabilities are advantageous.

The system has been described thus far with reference primarily to the basic arrangements wherein one section of the memory (the A zone) has stored therein combinations of binary signals each related on a one to one basis to a given key on the keyboard and with the C zone having multiple character codes sequentially arranged in accordance with the required sequence as established by selected keys on the keyboard. In this latter regard it should be noted that the left-hand grouping of keys on the keyboard having numbers on the surfaces thereof are effectively multiple character keys. The C memory zone can be programmed to contain any given length of message within the storage capabilities of the C zone and such message will be automatically read into the B memory zone in the proper sequence in response to the operation of a single key on the keyboard. One specific application of the left-hand multicharacter keys on the keyboard is in the case of a reporter making a record of a meeting wherein several individuals are present and it is desired to identify the statements made by each. In such event the C memory zone would have stored therein for each of the left-hand multicharacter keys on the keyboard the name of an individual followed by the necessary controls for printout of a colon. During the conference each member would then have positioned in front of him a small placard bearing a number corresponding to the number of the keyboard which would address the member's name in the C memory zone. As will be seen hereinafter, and as will be seen by reference to the small key identification numbers in FIG. 2B, the left-hand multiple character keys 1-—9 are given preference in the sequence for inputting of data to the B memory zone. Thus the reported in taking down the first statement made by man No. 1 would merely depress key No. 1 at the same time as he is depressing a multiplicity of additional keys representing phonetically the statements being made by man No. 1. Then during the processing of the information resulting from the first stroke made in response to the first statement by man No. 1 the C zone would be interrogated in the manner previously described so that the output recording equipment would first record the man's name followed by a colon and then the initial portion of the statements taken down by the reporter through operation of the additional keys.

It should be noted that while the various areas of the system have a ten-bit capability for the words being processed, all ten are not used for the actual character identifications. Thus the additional bits can be utilized for identifying not only the nature of a given word (as for example to identify whether the same is a multicharacter address or a single character address) but also the same permits utilization of additional bits for flagging the output for selected machine controls. Thus, for example, in the case of a multicharacter key representing an individual's name the output is conveniently flagged with a code representing to the printing equipment that an indentation of a selected number of spaces as well as line space operation should precede any printing function.

As will be evident to those skilled in the art, the format control unit 597 together with the output sequence and control unit 601 and the character counter 600 will serve to provide the desired degree of format control to the printer 504 and/or the recorder 503. For example in one system designated the tapewriter, recorder 505 is used as an intermediate storage unit for later use of the tape in controlling a conventional IBM "chain" printer.

The format on magnetic tape in that system consists of constant record length groups of characters separated by interrecord gaps. The specific record length consists of a control code, one character, followed by 80 characters of information. These codes are standard binary coded decimal (BCD) with even parity both lateral and longitudinal. This is a six-bit code with a seventh bit providing even parity. The 81 character record is followed by a gap of three to five characters in length, a longitudinal parity character for all seven tracks followed by the interrecord gap of three-quarters of an inch. A nominal line length of 70 characters was selected and provisions made therefor. On outputting of data from zone B in the memory, characters, including spaces, are counted by the line character counter 600. If the count of 65 is reached, then the next space code will be sensed beyond that count. This initiates an automatic line advance signal which requires filling of the record group with spaces out to the count of 80. Output of data from the B zone is interrupted during the space signal filling operation via line 600A from counter 600 to buffer 595. when this sequence is completed, a record gap is called for. The print control character is then inserted. Depending on whether single or double space is the selected mode, the appropriate control character is recorded. It will be seen that zone B of the memory is not accessed during the above and subsequent to the space after count 65. At this time after the print control character has been written as the first of the character block on magnetic tape, the sequence of transfer from zone B to magnetic tape is reinitiated. The line character counter is reset during the interrecord gap sequence. This unloading process of zone B in the memory, etc., is continued until the message output address register (MOAR) has caught up with the message input address register (MIAR) which indicates there is not any data left in zone B.

One variation in the above sequence of preparing a tape for the line printer was programmed to occur. Data bit D on output from zone B of the memory was continuously monitored for a 1. This special code is used for an operator controlled new line request and is derived from a stored code in zone A or C and used in connection with the return paragraph, and new page special function keys (FIG. 2). This 1 in the D data bit location is normally accompanied with a space code and is interpreted by the output sequence to force a new line. This requires filling of the data block regardless of the character count out to 80. This is accomplished, and as before the longitudinal parity and interrecord gap are called for. However, the printer control code is now obtained from the next word as stored in zone B in the memory as opposed to the forced code depending on the single or double space selection. With this exception, the unload or output mode will then continue as defined before. The special print codes as discussed are as follows: single line advance—blank; double space—zero; triple space—minus sign; no line advance—plus sign; new page—the numeral 1. These characters are also in standard BCD code with even lateral parity.

The constant record length defined as 80 characters of information is obviously arbitrary and can be less or up to 132 characters per line assuming desired compatibility with the specific IBM line printing equipment. This limit is the normal line column restriction. If a record length of longer than 132 characters is desired, then a splitting of the line into two or more print lines will be in general required and readily accomplished.

To provide complete flexibility on functional assignment related to each key, a programmable load or key function assignment concept is used. The core memory is properly loaded in the A and C zones with appropriate codes according to the required arrangement. The keyboard keys will be on a one-to-one basis with the associated A zone location either being a true character code or a C zone address. This data of course is loaded prior to equipment usage for recording of data. As is well known in the art of core storage systems, with proper shutdown and restarting, the data stored in the A & C zones is not destroyed. However, to insure proper operation each time the system is used, the load mode can be used for loading of zones A & C each time just after the power is turned on. The load mode is selected by keyboard switch 1200. The format input unit 611, which in the system shown is a tape recorder/playback unit having the desired data recorded on a tape, is placed in the read mode. While a recording having ten-bit words thereon is advantageous, it is evident that a recorder having less than a ten-bit capability can be used simply by using two adjacent characters on the tape for defining a single character for storage in the selected memory zone. In one system operating in this last-mentioned manner for loading the memory (i.e., two characters from tape per character for core storage), data was read from the tape recorder via interface amplifiers through a bipolar input commutator. Lateral parity check was made at this point prior to commutation. Data was read in at the rate dependent on the clock output pulse from the tape recorder. Every second clock output pulse after an appropriate delay initiates a clear write strobe to the memory. Memory address is controlled by the main memory address control register for the given zone and sequenced from an initial address of ten zeros with each memory strobe. The specific commutation format for that system is as follows: data bits one, two, four, eight of the first word comprise memory bits seven, eight, nine, and ten or C, D, E, F if the F bit is a one. If the F bit is zero, then only the two, four, eight (or D, E, F bits) are loaded into the eight, nine, ten data input register locations by the commutator. The second word is loaded in the configuration one, two, four, eight, A, B, P for bits one through seven if F on the previous word was zero. If F on the previous word was one, then only data bits one, two, four, eight, A B are used in the corresponding locations one, two, three, four, five, six (the seventh having been previously defined). This composite ten-bit word is then loaded into the appropriate sequential address in the memory. The input tape using this technique should consist of 2,048 words. If for some reason the input tape exceeds this amount, the input or load sequence will automatically be terminated by a monitor gate on the memory address control register. Normally, zone B is preferably loaded with any nonzero configuration if in the system an all zero character recorded on tape will not produce a clock pulse when played back. The load tape format is believed to be obvious in view of the state of the core memory art. After initial operation, preparation of a load tape can obviously be accomplished with the machine itself used to prepare the load tape.

During read and write exercises of the magnetic tape recorder, both lateral and longitudinal parity are checked regularly. If an error is detected a warning status is lit. After corrective action the operator pushes the reset button. To enable the operator to determine if the output codes to the tape recorder are appropriate and to verify the keyboard and electronic buffer operation, a set of monitor indicators 611 are provided. The monitor indicators always read the last character which was transmitted to the tape recorder (or direct to the printer) via the data output register. Therefore, the operator may check each single function key one at a time by depressing that key as a single key stroke and observing the monitor indicator lights to see if their binary notation corresponds to the code assigned to the operated key. For multicharacter key depressions, because of the relative speed, only the last character of the multicharacter set is observed on the monitor indicators 611. The usual file mark button, which is located away from the main keyboard area on the keyboard console, is used at the end of a reporting activity wherein a tape is prepared for later control of a printer to mark the end of data on that tape reel prior to dismounting the data reel. This file mark switch depression will provide an appropriate pattern on the tape to signify the end of a record and facilitate printing and other processing for which the tape might be used.

Figure 4:
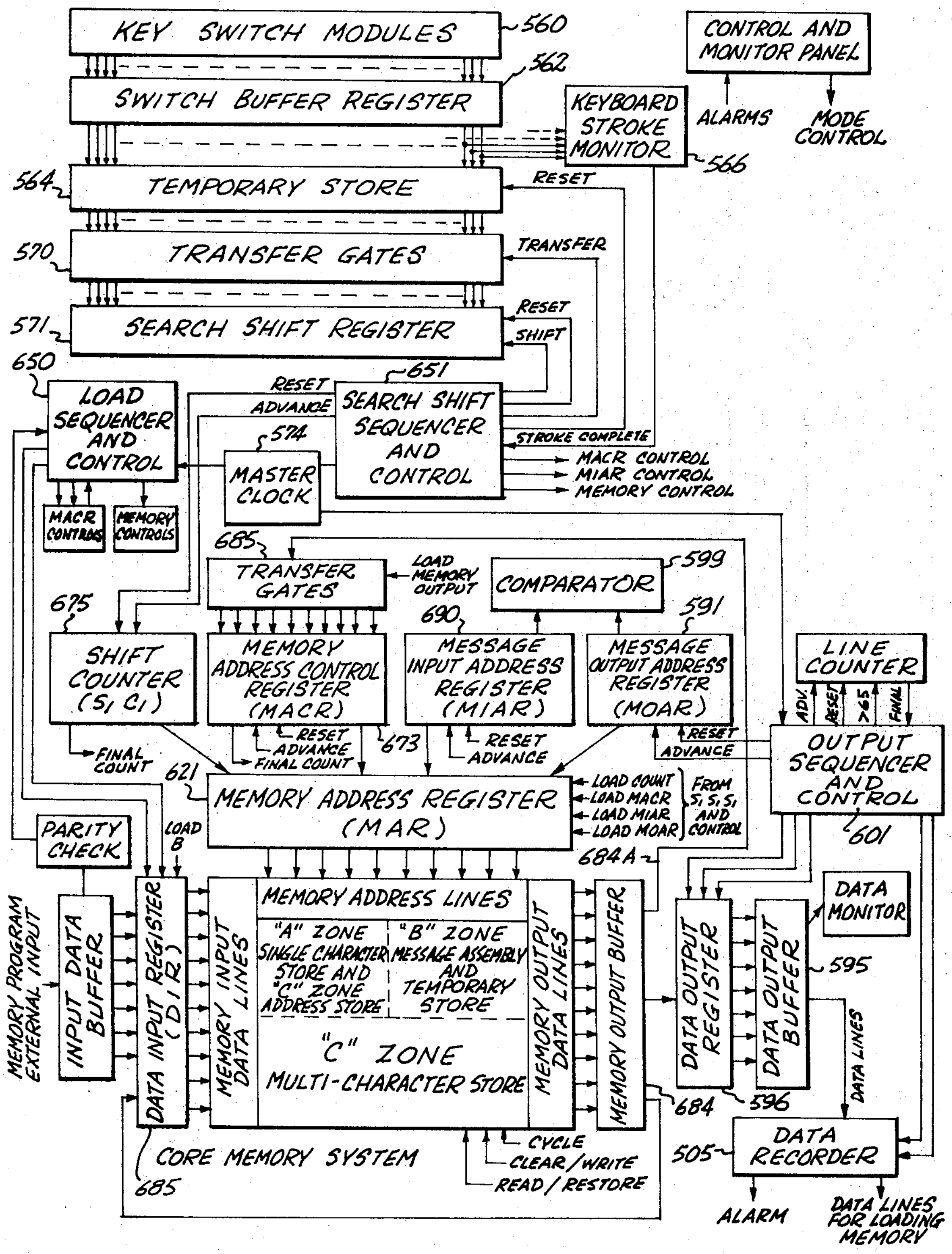
FIG. 4 is a block diagram of a preferred embodiment of the invention similar to that of FIG. 3 but having the memory section shown as a single unit, with FIGS. 5—22 showing in detail the components of the system of FIG. 4.

The system of FIG. 4 corresponds essentially to the system of FIG. 3 with FIG. 4 showing the relationship of common drive circuits to the single core memory having three separate sections. The key switch modules 560, "K" register 562, temporary storage register 564, transfer gates 570, and search shift register 571 as well as various other units corresponding to those of FIG. 3 and bearing the same reference number are seen in FIG. 4. The load sequencer and control 650 and the search shift sequencer and control 651 operate in similar manners to control the loading and unloading of the memory and the actual search operation. As in FIG. 3 the shift counter 675 controls the memory address register (MAR) 621 during shift register search operations. As in FIG. 3, the memory address control register responds to the occurrence of a 1 in the last order thereof to cause the A zone of the core memory to be accessed during the following read/restore cycle. The read/restore cycle from A zone causes the selected data to be read from the A memory zone into the memory output buffer 684 and then into the data input register (DIR) 685. The message input address register 690 then determines the location in the B zone into which the data of the data input register will be read by the next clear/write memory cycle. On reading of the data from the A zone the output buffer 684 is monitored so that the highest order bit being 0 causes the contents of the A zone message now in the data input register to be read into the B zone. The message input address register 690 is then advanced by one count and control is returned to the search shift sequence and control unit. Further data is then processed from the search shift register.

When a multiple character stroke occurs the MAR is set for accessing the proper area in the A zone for withdrawal of a C zone address. This address is then read from the memory by a read/restore cycle of the A zone. The ten-bit code thus read from zone A carries an F bit of 1 and as a result line 684A from the memory output buffer 684 to transfer gates 685 associated with the memory address control register 673 will set the MAR for C zone accessing. The C zone is then accessed and data is read from the C zone by a read/restore cycle. The data is read via the memory output buffer back into the DIR and the MOAR selects the next B zone location for receipt of the data. A clear/write cycle then takes place with the data in the DIR being read into the B zone in accordance with the address selected by the message input address register. So long as the E bit of the data read from the C zone is a 1, repeated accessing of the C zone will occur and the string contained therein will be assembled in the B zone. During each such cycling of the C zone the message input address register will be upcounted by an advance pulse so that the information is properly formatted in the B zone for readout to a recorder or printer. Also each read/restore cycle from the C zone upcounts the memory address control register by one count so that the multicharacter string from the C zone will be read in proper sequence. The cycle is seen to be one involving first a read/restore cycle from the C zone as controlled by the MACR and then a clear/write cycle of the B zone as controlled by MIAR. This process continues until a zero bit in the E location is detected. When this occurs control is returned to the search shift sequencer and the previously described manner of operation takes place.

Figure 11A:
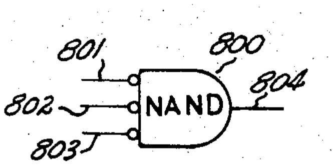
FIGS. 11A–11G are diagrams illustrating the symbology for the components of the schematic diagrams.
Figure 11D:
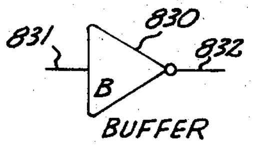
Figure 11F:
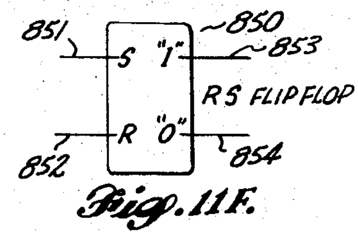
Figure 11B:
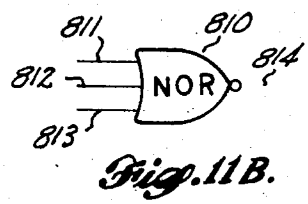

Further details of one system constructed in accordance with the teachings of FIG. 4 are illustrated by the logic and circuit diagrams of FIGS. 5 through 22. The symbology used in these diagrams is believed to be well known to those working in this art, but in order to assist the reader in following the diagrams there is set forth in FIGS. 11A–11G the notations used in the logic diagrams. Thus FIG. 11A shows a NAND gate 800 which is essentially a negative logic gate having three input leads 801, 802, and 803 and a single output lead 804. The NAND gate is essentially a "notted or" gate and provides a high level on its output 804 only when all of the input leads are at a low level (i.e., when there is no input on 801, and 802, and 803, and any other input). If any input is high the output is low. Similarly the NOR gate 810 of FIG. 11B is referred to as a positive logic gate and is shown as having three input leads 811, 812, and 813 with a single output lead 814. The arrangement is such that the output lead is low so long as any input is high and the output goes to a high level only when each of the input leads thereto is low. In each case the gate can be provided with a number of input leads and thus for purpose of illustration each is shown as having three inputs. FIG. 11C illustrates a conventional inverter 820 having an input lead 821 and an output lead 822 and serves to invert signals applied thereto. The buffer of FIG. 11D is essentially an inverter (and will also be referred to as an inverter) but has greater drive capability.

Figures 11E, 11G:
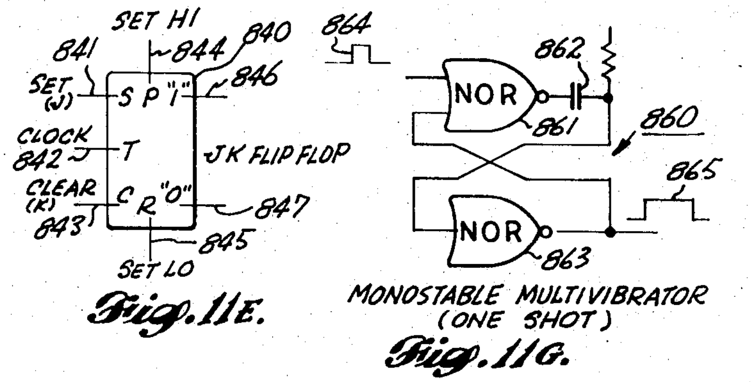
Figure 11C:
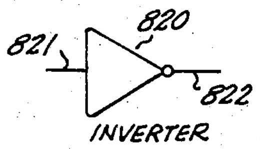

FIG. 11E is the symbology used to denote a bistable circuit referred to in the art as a JK flip-flop 840. Such flip-flops are well known and are widely used as a general purpose storage element featuring both clocked and asynchronous inputs, and is well suited for use in shift registers, counters or general control functions. Thus the JK flip-flop is shown as having the clocked set and clear input leads 841 and 843 which are controlled by the application of a clock pulse to the T lead 842. Nonclocked preset Hi and reset Lo leads 844 and 845 are also provided, with the usual 1 and 0 output leads 846 and 847 also being included. Thus the JK flip-flop will be seen to be usable as a steered flip-flop as well as a straight DC set-reset element.

FIG. 11F shows another bistable circuit well known in the art and referred to as the RS flip-flop 850 having set and reset leads 851 and 852 and output leads 853 and 854. The RS flip-flop is essentially a straightforward DC flip-flop which is responsive to the leading edge of applied control signals.

FIG. 11G is an illustration of a conventional monostable multivibrator (also referred to as a one-shot) made from the NOR gate 861 having its output circuit coupled by the timing capacitor 862 to the input of a second NOR gate 863. The output circuit of the NOR gate 863 is applied as an input to the NOR gate 861. As is well known in the art, the application of a short duration input signal 864 causes the monostable circuit to be triggered to its unstable condition for a predetermined time interval and thereby provide an output signal such as illustrated as the output signal 865.

In referring to various signals or the absence of signals, a bar above a signal or word denotes "not". That is, an indication of a $\overline{\text{stroke}}$ denotes the inverse of a stroke signal.

Figure 5:
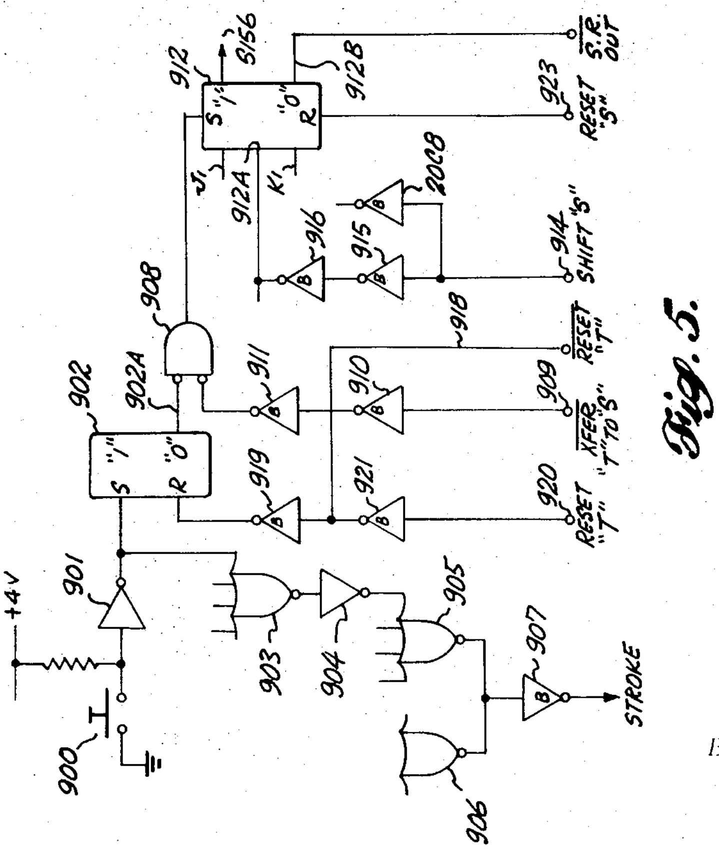
FIG. 5 is a block diagram of a single order for the keyboard section including the shift register output.

Turning now to FIG. 5 a detailed diagram of one keyboard and shift register circuit found to work well in accordance with the system concepts of FIG. 4 will be described. One difference in the arrangement of FIG. 5 is that the K register of FIG. 4 has been eliminated since it has been found that with a high speed data processing capability, the operation of a key 900 on the keyboard can be used to directly set the RS flip-flop 902 in the T register (the signal being applied through an inverter 901). The output from the inverter 901 also goes to the NOR gate 903 having three alternate input circuits 903-2, 903-3, 903-4 coupled with three additional keys on the keyboard. The output of NOR circuit 903 is inverted by inverter 904 and applied as one of the inputs to a further four input NOR gate 905. A similar chain of NAND gates terminating in the NOR gate 906 provides an arrangement where each key on the keyboard effectively serves as a control via the buffer 907 to provide the stroke signal previously described. The result is that the depression of any key initiates a stroke but the stroke is not completely defined until all keys which have been depressed are released. Each "T" register flip-flop corresponding to flip-flop 902 which is going to be set for a given stroke will therefore be assured of being set before release of the last key.

Still referring to FIG. 5, it will be seen that the T register flip-flop 902 has its 0 line 902A coupled as an input to the NAND gate 908. Thus when a transfer signal is applied to terminal 909 for application to the gate 908 via the buffer 910 and buffer 911, the contents of the T register will be transferred to the associated JK flip-flop 912 in the search shift register. The contents of the search shift register are then shifted by means of shift pulses applied in parallel to all stages of the register. The shift pulse line 914 transmits the clock pulses used to control the shift operation, and thus line 914 will be seen to be connected via the buffer 915 and buffer 916 to the shift control terminal 912A of the flip-flop stage 912. In the illustration of FIG. 5 the flip-flop 912 is indicated as being the last stage of the search shift register and thus its output terminal 912B serves as the search shift register output circuit.

In order to be certain that all registers and the various flip-flops in the circuit are properly reset at the initiation of the operation of the system a T register reset line 918 is coupled via the buffer 919 to the reset terminal of each T register flip-flop corresponding to flip-flop 902. Also a "reset T" input line 920 from the search shift sequence and control unit is coupled via the inverting buffer 921 to the T register reset terminal. Similarly, the S register stages are reset by a signal on the "S register reset" line 923.

Figure 6A:
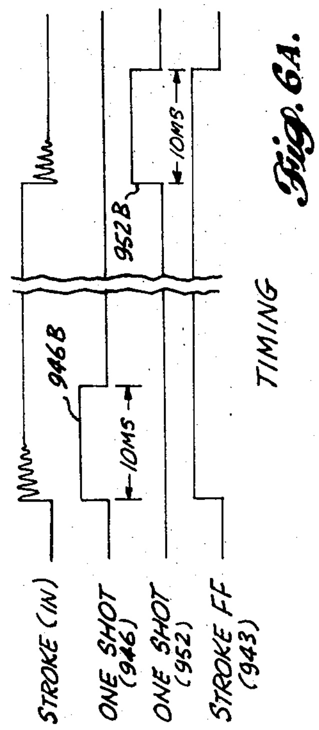
FIG. 6 and 6A are respectively the stroke filter and timing diagram therefor.
Figure 6:
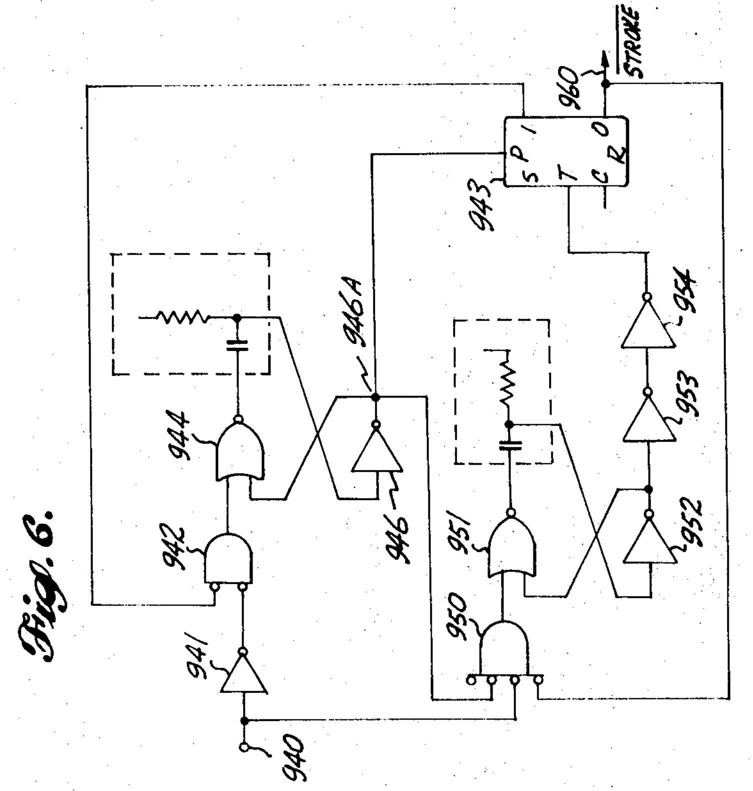
Figures 10, 10A:
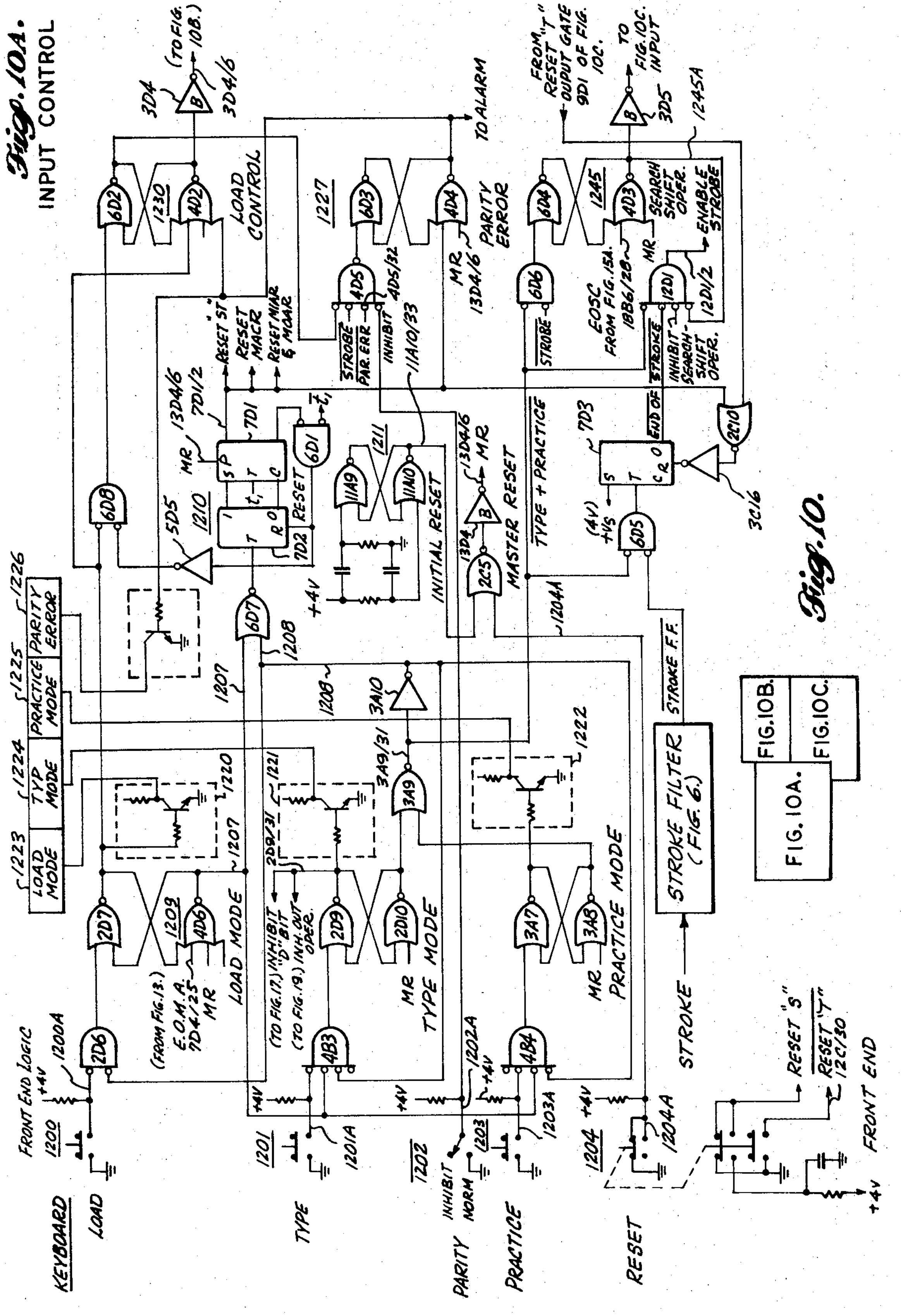
FIG. 10 is a diagram of the relationship of FIGS. 10A, 10B, and 10C which are schematic diagrams of the master control logic for one system incorporating the schematic diagrams of FIGS. 5—22.

To avoid any problem associated with ringing of the circuits due to noise signals from the switch contacts a stroke filter circuit as shown in FIG. 6 is included in the system controls of FIG. 10. When the stroke signal from the buffer 907 of FIG. 5 is applied to the input terminal 940 of FIG. 6 the inverter 941 provides a signal to the NAND gate 942 which has its second input terminal coupled with 1 output of the stroke filter flip-flop 943 (a JK flip-flop). The NOR gate 944 provides a signal via capacitor 945 to the inverter 946, the gate 944 and inverter 946 being connected to form a one-shot or monostable multivibrator (as seen in FIG. 11G) since the output circuit 946A is coupled back as one of the input circuits for the NOR gate 944 as well as to the input of flip-flop 943. The circuit constants are such that a 10 millisecond output signal is provided on circuit 946A from the inverter 946 to the JK flip-flop 943. The signal 946B of FIG. 6A therefore inhibits firing of the reset one shot and subsequently the flip-flop 943. Thus oscillations which might otherwise occur are avoided during the switch bounce interval.

It will be seen that the input terminal 940 is also coupled to the NAND gate 950 which in turn through the NOR gate 951 and the inverters 952, 953 and 954 provides a control signal to the stroke flip-flop 943. The inverter 952 in combination with the NOR circuit 951 acts as a second one-shot circuit providing a signal 952B to the flip-flop and thereby preventing oscillation of the stroke flip-flop during opening of the keys on completion of a stroke. As seen by the timing diagram of FIG. 6A the circuit of FIG. 6 effectively controls the stroke flip-flop 943 in response to the generation of a complete stroke by initial closure of one or more keyboard switches and the subsequent release of the last keyboard switch. Thus a clean stroke or "not stroke" $\overline{\text{stroke}}$ signal is provided on output terminal 960.

In FIG. 7 the details of the master clock or time signal generator for the system of FIGS. 4 and 10 is illustrated. In one system the clock pulse rate was 1 megacycle and thus the free running oscillator 1000 is shown as providing output signals through the NOR gate 1001 and the buffer 1002 to the T (or toggle terminal) of the JK flip-flops 2A1 and 2A2. A feedback arrangement is provided between the two JK flip-flops in that the "1" output terminal of flip-flop 2A2 is connected to the "clear" terminal of flip-flop 2A1 and the "0" terminal of flip-flop 2A2 is connected to the "set" terminal of the flip-flop 2A1. The arrangement will be seen to be such that the clock signals $\overline{C}_1$ and $\overline{C}_2$ as well as the inverse signals thereof identified as $C_1$ (not $C_1$) and $C_2$ (not $C_2$) are provided. These four signals from the JK flip-flops are paired in the manner indicated through the NAND gates 3A3, 3A4, 3A5, and 3A6 to provide the timing signals indicated on the output circuits of the buffer units 7A5, 7A6, 7A7 and 7A8 to which the NAND gates are coupled, respectively. The additional buffer 10A8 (or inverter) provides the timing signal indicated as $t_1$. Also the output of buffer 7A6 is connected as one of the inputs for the NAND gate 6A10 with the other input for the NAND gate 6A10 coming from the oscillator via NOR gate 1005 and the buffer 1006. Similarly the output of buffer 7A8 is applied to the input of the NAND gate 2D8 along with the signal from buffer 1006. The output of NAND gate 2D8 is inverted by the inverter 5D14 and provides a clocked output identified as $\overline{t}_4d$.

The various timing signals provided from the circuit of FIG. 7 will be seen in FIG. 10 as controlling the occurrence of the cycles of the system previously described. The system also makes use of additional timing pulses referred to as strobe signals as well as signals indicating the absence of a signal $\overline{\text{strobe}}$. The strobe signals are provided by the circuit of FIG. 8 which includes the NOR gate 3A1 having strobe enable input terminals 18B5/29 and 12D1/2. These two strobe enable circuits will be seen in FIG. 10 to be provided from the NAND gates 18B5 and 12D1, respectively, which are described hereinafter. The signals from NOR gate 3A1 are applied via inverter 10A8 to the SET terminal of the JK flip-flop 2A3 as well as being applied directly to the clear terminal of flip-flop 2A3. The cycling of flip-flop 2A3 as well as of the JK flip-flop 2A4 will be seen to be controlled and maintained in sync with the master clock by means of the timing pulses $t_1$ applied to the toggle control terminals of the two flip-flops. The 0 output from flip-flop 2A3 and the 1 output from the flip flop 2A4 are applied to the input of NAND gate 3A2 whose output is applied to the buffer 4A1. The output of the buffer 4A1 provides the $\overline{\text{strobe}}$ signal with that signal being further inverted by the buffer 15A4 in order to provide the strobe signal with sufficient fan-out. These two control signals will also be seen in FIG. 10 as controlling various gates for the application of further control signals to the memory and related portions of the system of FIG. 4.

Figure 9:
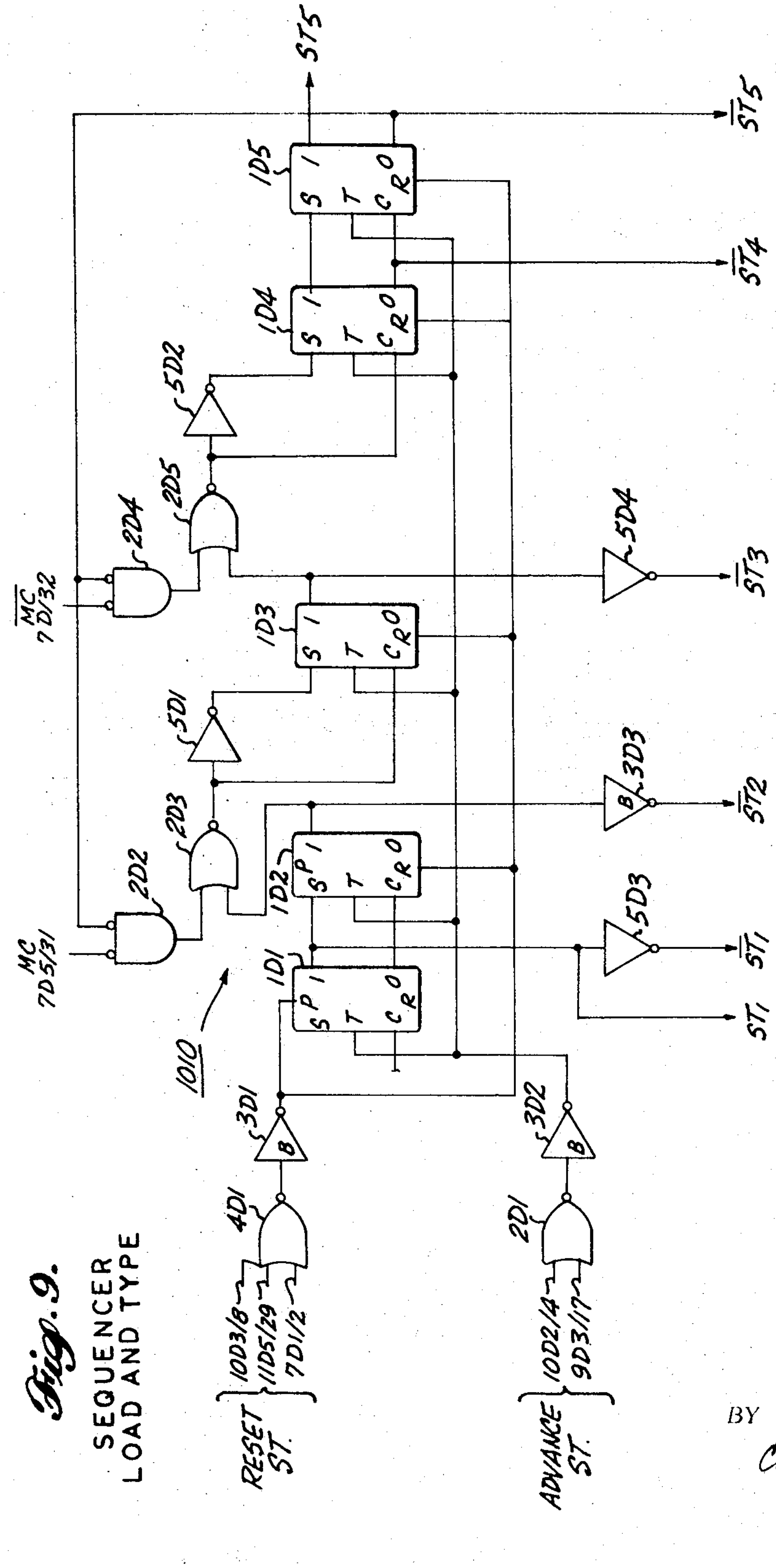
FIG. 9 is a schematic diagram of the sequencer and time counter referred to as the "ST" counter.

In addition to the timing and strobe signals from the circuits of FIGS. 7 and 8, which are also seen in the control logic diagram of FIG. 10, it will be noted that a number of control signals designated "ST" and "$\overline{\text{ST}}$" appear in FIG. 10. These are the sequence timing signals provided in the manner indicated previously with reference to the overall system description. Such signals are generated for the memory loading and typing sequences by the sequence timing circuitry of FIG. 9. Referring now to FIG. 9 it will be seen that the sequence timing and control arrangement includes an "ST" counter 1010 which is essentially a special ring counter having five stages made up from the JK flip-flops 1D1, 1D2, 1D3, 1D4, and 1D5. The sequence timing circuit of FIG. 9 will provide the timing signals indicated as; $ST_1$, $\overline{ST}_1$, $\overline{ST}_2$, $\overline{ST}_3$, $\overline{ST}_4$, $ST_5$, and $\overline{ST}_5$. The advance of the count in the counter 1010 occurs in response to the advance ST signals applied to the NOR gate 2D1 via the input lines 10D2/4 and 9D3/17 which are also to be seen in FIG. 10. These advance signals are applied from the NOR gate 2D1 by the buffer 3D2 to the T control terminals of the five JK flip-flops in a manner well known in the art. Resetting of the counter is under the control of the input reset lines 10D3/8, 11D5/29, and 7D1/2 which are shown as being applied through the NOR gate 4D1 and buffer 3D1 to the indicated reset terminals of the JK flip-flops.

The counting cycle of the sequence timer of FIG. 9 is under the control of the multicharacter monitoring and control flip-flop 7D5 (FIG. 10) which provides either a "MC" signal or a "$\overline{\text{MC}}$" signal. As previously described, and as seen from FIG. 10, a "multicharacter" or a "not multicharacter" signal is obtained by monitoring the "E" bit and the "F" bit of the data read from the A and C zones of the core storage. As seen in FIG. 9, the MC signal is applied via NAND gate 2D2 and NOR gate 2D3 to the CLEAR terminal of flip-flop 1D3 as well as to the SET terminal of flip-flop 1D3 via inverter 5D1. In a similar manner, the $\overline{\text{MC}}$ signal is applied through NAND gate 2D4 and NOR gate 2D5 (together with inverter 5D2) to the flip-flop 1D4.

The ST counter is preset to "one" and can then count in response to clock pulses. When the shift register output goes true, the ST counter goes to a two count and the functions indicated in the timing diagram take place. During the "two" count a single character is read from the A section and then into the B section during time "three" of the ST counter. When the ST counter is at any count other than "one" it advances on each clock pulse. When it reaches a four count it is then reset to one. However, when the multicharacter flip-flop 7D5 (FIG. 10) changes its state in response to the presence of a multicharacter string the ST counter 1010 then continues to count from four, to five and then repeatedly alternates between a four and a five condition so long as a multicharacter string is being processed. As seen in the timing diagram and from the control logic of FIG. 10, during the four count condition a character is read into the B zone (from C) and during the five count a character is read from C zone (for input to B). When all of the characters in the "C" zone making up the multicharacter string have been processed into the "B" zone the multicharacter flip-flop 7D5 reverts to its normal condition and the ST counter 1010 of FIG. 9 resets first to three, then to four, and then back to a one count.

Figure 10B:
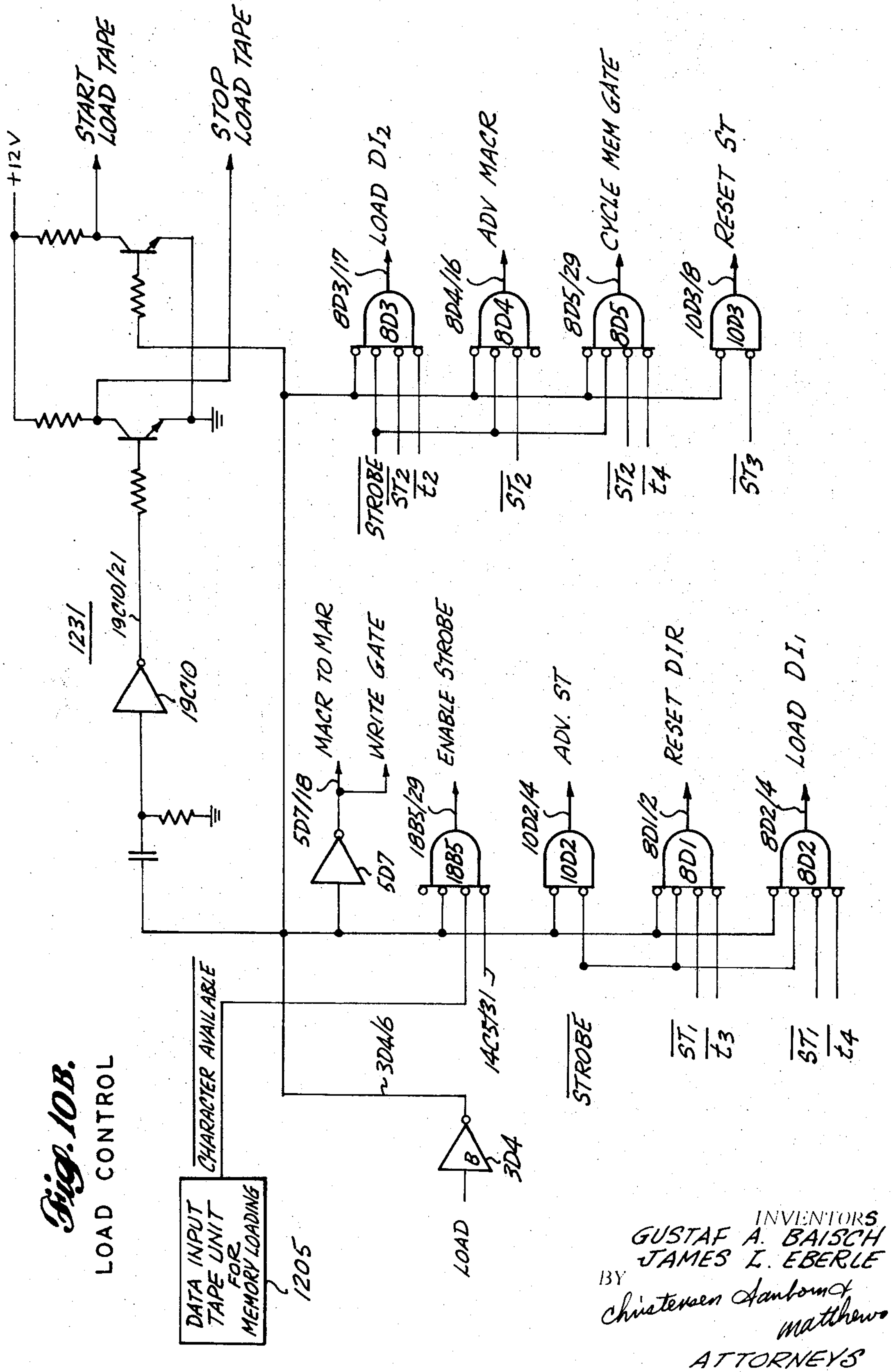
Figure 10C:
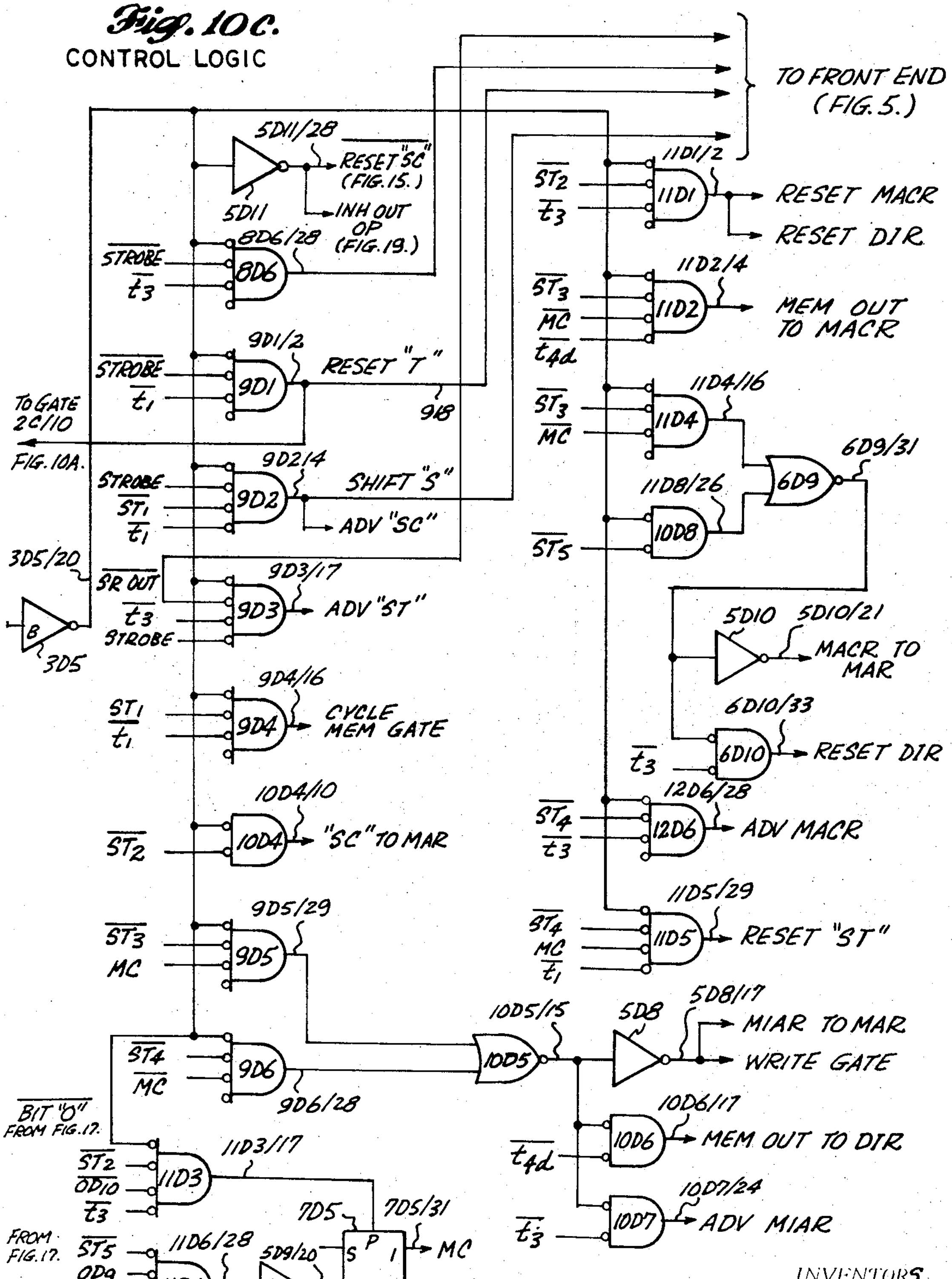

FIG. 10 illustrates the manner in which FIGS. 10A, 10B, and 10C are related. FIGS. 10A, 10B, and 10C show the logic details for the main control section of one system incorporating and using the circuits of FIGS. 6—9 and the remaining logic diagrams. The main control switches of FIG. 1 are seen in FIG. 10A to include the load control switch 1200, the type control switch 1201, the parity control switch 1202, the practice control switch 1203, and the main reset switch 1204. The load switch 1200 serves to place the system in proper condition for loading the various memory locations with the data which will be read to a recorder or a printing system in response to the operation of the keys on the keyboard. For purposes of illustrating the invention a data input tape unit 1205 for memory loading is shown in FIG. 10B as providing the input signals to be recorded in the appropriate memory locations.

The load, type, and practice control switches of FIG. 10A are electrically interlocked in a manner such that once one of the switches has been operated the others cannot assume control so long as the first operated switch remains in its operated condition. Thus it will be seen that the input leads 1200A, 1201A, and 1203A from the respective switches go to the individual NAND gates 2D6, 4B3, and 4B4. These NAND gates inturn have their output circuits connected for control of an associated RS flip-flop so that when a signal is applied through the associated gate the RS flip-flop will change its state and hold the other two gates in a closed condition. The NOR gates 2D7 and 4D6 are thus connected as an RS flop-flop for the load mode and provides an output signal on lead 1207 which in turn will be seen to provide an input lead to the gates 4B3 and 4B4 for the type and practice switches. Those two gates will thus be inhibited when the RS flop-flop associated with the load mode has been triggered. In a similar manner a type mode RS flip-flop is provided by NOR gates 2D9 and 2D10 with a practice mode RS flip-flop being provided by the NOR gates 3A7 and 3A8. The type mode flip-flop output and the practice mode flip-flop have their output circuits connected through the NOR gate 3A9. The output of gate 3A9 is inverted by inverter 3A10 so that the signal on the output lead 1208 thereof will control gate 2D6, 4B3, and 4B4 and hence provide the required interlock between the three control switches.

Lines 1207 and 1208 which are controlled by the load, type, and practice flip-flops will be seen to be applied through the NOR gate 6D7 to the toggle input of JK flip-flop 7D2 of the reset control circuit 1210. The interconnections between the JK flop-flop circuits 7D2 and 7D1 of the reset control circuit 1210 will be seen to be such that output lead 7D1/2 from the JK flip-flop 7D1 will be provided with a reset signal for application to various parts of the system described hereinafter.

The reset control circuit 1210 has an input lead 13D4/6 applied to the preset terminal of the JK flip-flop 7D1. Circuit 13D4/6 is the output circuit of the master reset buffer 13D4 which will be seen to be controlled by the NOR circuit 2C5 having input circuits 1204A and 11A10/33 coupled thereto. As previously described the circuit 1204A is under the control of the reset switch 1204. Circuit 11A10/33 is the output circuit of the initial reset circuit 1211 which comes into operation momentarily when power is initially applied to the system.

As seen in the lower left portion of FIG. 10A, operation of the reset switch 1204 also serves to provide the reset "S" and reset "T" signals ( seen also in FIG. 5).

The load mode, type mode, and practice mode circuitry of FIG. 10A will be seen to include the lamp driver circuits 1220, 1221, and 1222 which respectively control the load mode (seen the type mode lamp 1224, and the practice mode lamp 1225. A parity error lamp 1226 is also provided and is under the control of the parity error flip-flop 1227. The input control gate 4D5 associated with the parity error flip-flop 1227 will be seen to be under the control of the parity control switch 1202 so that parity control can be inhibited or placed in normal operation depending upon the desires of the operator. The NOR gate 4D4 in flip-flop 1227 will be seen to be coupled with the master reset circuit 13D4/6 as well as with the reset output circuit 7D1/2 and thus the parity error flip-flop will be reset in the manner previously described.

A load control flip-flop 1230 will be seen to be coupled by the NAND gate 6D3 to the load mode control flip-flop 1209 so that an output signal will be provided by inverter 3D4 to the load control circuitry of FIG. 10B when the equipment is in load mode. As seen in FIG. 10B the output circuit 3D4/6 from the load control flip-flop 1230 is applied as one input to the inverter 5D7 as well as to each of the NAND gates 18B5, 10D2, 8D1, 8D2, 8D3, 8D4, 8D5, and 10D3. The circuit 3D4/6 is also applied via the data input tape control circuit 1231 to provide the start load tape signal and the stop load tape signals indicated in FIG. 10B. The additional input circuits for the gates of FIG. 10B will be seen to include the timing, strobe, and ST count signals previously described. As a result the various control signals required for loading the memory in the manner indicated in the timing diagram for the load operation will be provided. In the particular system illustrated each word location in the A and C zones is preset therein by reading from the data input tape the two sets of data described earlier for defining each ten-bit word. Thus, it will be seen that gates 8D2 and 8D3 control the memory locations as indicated in FIG. 16 in response to the receipt of bits of data from the input tape unit 1205. As seen in FIG. 16 the input data signals from the loading tape unit 1205 are applied to the inverters 19C1—19C7 with the signals being applied to a conventional parity check circuit 1240 having an output parity error circuit 4D5/32 connected as an input circuit for the gate 4D5 (FIG. 10A) of the parity error flip-flop 1227.

As seen in FIG. 16 the data input register (DIR) for the core memory makes use of ten JK flip-flops 4C1—4C5 and 5C1—5C5. These flip-flops in the data input register are simply used in their preset-reset mode of operation and thus only the P, R, and output circuits are illustrated in FIG. 16. As described above, data is read from the memory output back into the data input register. Thus it will be seen in FIG. 16 that the memory output lines $\overline{MO_1}$—$\overline{MO_5 12}$ are under the control of the buffer 3D7 having an input circuit 10D6/17 which will be seen and described in connection with FIG. 10C and the timing diagrams.

Once the memory has been loaded by the load mode operation a one-to-one data relationship exists between the keys on the machine keyboard and the A zone memory locations. Then in the manner previously described the operation of a plurality of the keys will cause the selected A zone memory locations to be accessed in a preferential sequence with single character data being read from the A zone to the data output register and then back into the B zone for subsequent readout in proper sequence. The data read from the A zone is monitored to determine whether or not the information read from the A zone is a true character representation or is merely the address for accessing the C zone for a multicharacter string. Thus as previously described the "F" bit of the data read from the A zone is monitored. Also, once the C zone has been accessed and a multicharacter string is being withdrawn therefrom for entry into the B zone, the "E" bit of the data is monitored for an indication that the end of the multicharacter string has been reached.

As seen in FIG. 10 and as explained further with reference to FIG. 6, the stroke filter output circuit and the output circuit 3A9/31 from the NOR gate 3A9 associated with the type mode and practice mode circuitry are applied to the NAND gate 6D5. The output of gate 6D5 controls the end of stroke flip-flop 7D3 which in turn controls the strobe control gate 12D1 having its output circuit 12D1/2 coupled with the strobe circuit of FIG. 8. The type and practice mode output circuit 3A9/31 further controls the gate 6D6 coupled with the input of the search shift operation control flip-flop formed by NOR gates 6D4 and 4D3. The search shift operation flip-flop 1245 has its output circuit 1245A coupled to the strobe control gate 12D1 as well as through the buffer 3D5 to the various gates shown in FIG. 10C.

Turning to FIG. 10C it will be seen that the output circuit 3D1/20 from the output inverter 3D5 of FIG. 10A serves to control the indicated gates of FIG. 10C for enabling the timing, strobe, and ST signals to operate the various sections of the memory.

Near the lower part of FIG. 10C the multicharacter flip-flop 7D5 will be seen to be under the control of the NAND gates 11D3 and 11D6. It will be seen that gate 11D3 is controlled by the presence or absence of an F bit (0D10) in the output register of the memory while the gate 11D6 is controlled by the E bit (0D9) monitor (see FIG. 17). As a result the flip-flop 7D5 provides the "MC" and "$\overline{MC}$" signals shown as controlling the various gates in FIG. 10C.

Figures 12, 12A:
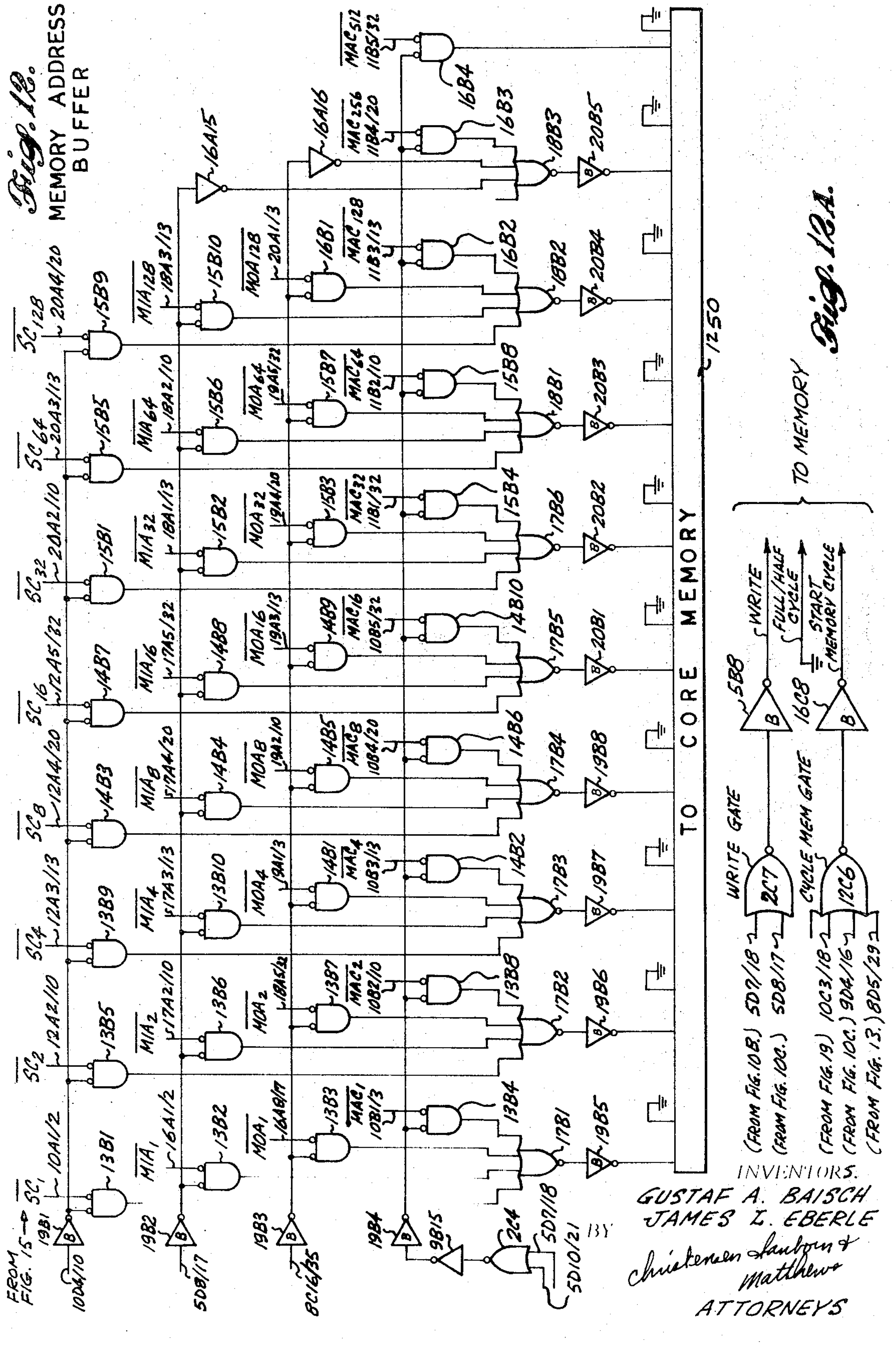
FIG. 12 is a schematic diagram of the memory address buffer.
FIG. 12A shows certain inputs to memory.

The memory address buffer (MAB) includes a plurality of gates together with buffer units for driving the core memory and is illustrated in FIG. 12. Referring to FIG. 12 it will be seen that the buffer units 19B5—19B8 and 20B1—20B5 have their output circuits coupled by the connector 1250 to the core memory with the input circuits of the buffer units being respectively controlled by the NOR gates 17B1—17B6 and 18B1—18B3 All but one of these NOR gates has four inputs with each of the four inputs being in turn controlled by a NAND gate. Thus NOR gate 17B1 is coupled with NAND gates 13B1—13B4; NOR gate 17B2 is coupled with NAND gates 13B5—13B8 NOR gate 17B3 is coupled with NAND gates 13B9, 13B10, 14B1, and 14B2; NOR gate 17B4 is coupled with NAND gates 14B3—14B6; NOR gate 17B5 is coupled with NAND gates 14B7—14B10; NOR gate 17B6 is coupled with NAND gates 15B1—15B4; NOR gate 18B1 is coupled with NAND gates 15B5—15B8; NOR gate 18B2 is coupled with NAND gates 15B9, 15B10, 16B1, and 16B2; and NOR gate 18B3 is coupled with the three input circuits provided by inverters 16A15, 16A16, as well as with the NAND gate 16B3.

Figure 15A:
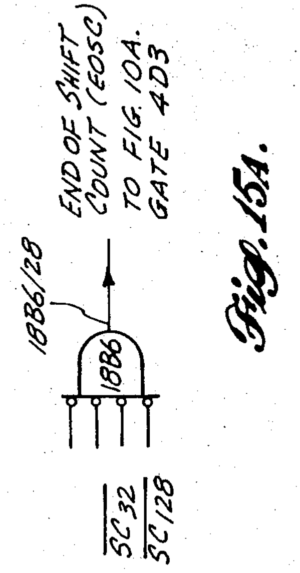
FIG. 15A shows the end of shift count gate.

The memory address buffer of FIG. 12 receives the shift counter output signals from the shift register counter of FIG. 15 via the leads 10A1/2, 12A2/10, 12A3/13, 12A4/20, 12A5/32, 20A2/10, 20A3/13, and 20A4/20 located along the top of the uppermost horizontal row of gates of FIG. 12. As seen in FIG. 15 the shift counter is made up from eight JK flip-flops 12A1—12A5 and 20A2—20A4 which provide the indicated circuits for the upper horizontal row of gates of FIG.

12. The input lines 9D2/4 and $\overline{5D11/28}$ of FIG. 15 (from FIG. 10C) apply the advance and reset signals via gate 11A1 and buffers 15A5 and 15A6 to each of the JK flip-flops of the SC counter.

Figure 14:
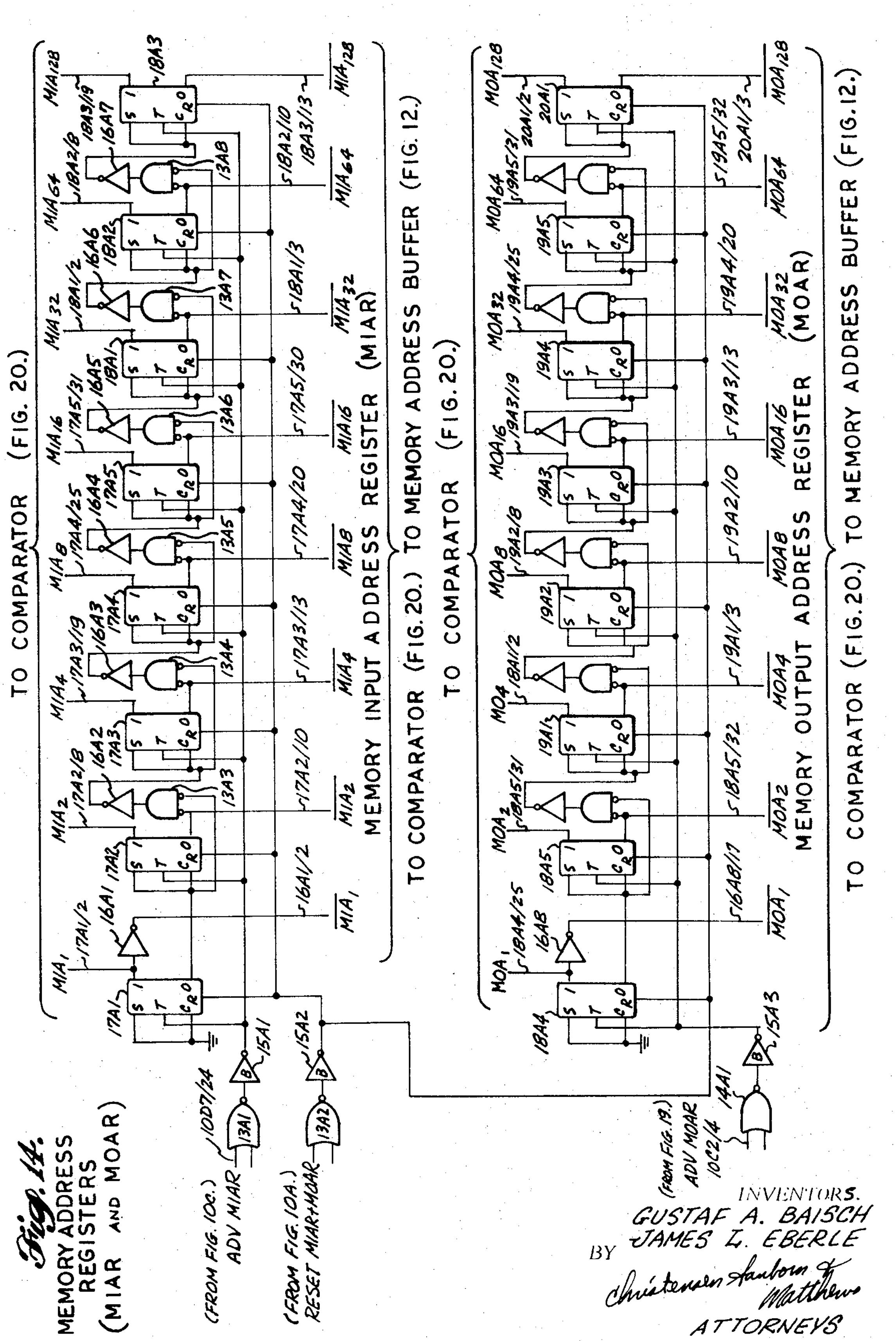
FIG. 14 is a schematic diagram of the memory address registers including the memory input address register and the memory output address register.

In a similar manner the second horizontal row of NAND gates in the memory address buffer of FIG. 12 are provided with output signals from the memory input address register of FIG. 14, (also referred to as the message input address resistor MIAR) the third horizontal row is provided with output signals from the message (or memory) output address register of FIG. 14, and the fourth horizontal row of NAND gates receives input signals from the memory address control register of FIG. 13. Selection of the horizontal row of NAND gates which will be operative at any given time is determined by the input signals applied to the buffers along the left edge of the memory address buffer and indicated as the buffers 19B1—19B4 A buffer 9B15 together with the NOR gate 2C4 preceding the buffer 19B4 provides an input circuit from gates 5D10 and 5D7 of FIG. 10C and FIG. 10B, respectively.

The memory input address register and the memory output address register (MIAR and MOAR) are seen in FIG. 14 to each include eight JK flip-flops. Thus the MIAR includes flip-flops 17A1—17A5 and 18A1—18A3, and the MOAR includes flip-flops 18A4, 18A5, 19A1—19A5 and 20A1. The MOAR and MIAR are seen to be controlled via gates 13A1 and 13A2 (together with buffers 15A1 and 15A2) from the advance and reset signals provided by the control circuits of FIGS. 10A and 10C. In addition the MOAR is controlled via NOR gate 14A1 and buffer 15A3 from the advance MOAR terminal of FIG. 19.

In addition to providing the indicated input signals for the memory address buffer of FIG. 12, the MIAR and MOAR of FIG. 14 each provide the indicated output signals to the comparator of FIG. 20. To facilitate understanding the system and the identification of various leads and signals it will be seen that the identifying characters "$MIA_1$, $MIA_2$—$MIA_{128}$" appear along the top of the MIAR output to the comparator. Those designate the memory input address location with the subscript identifying the binary weight of the bit. Similarly the memory output address locations as well as the inverse of each set (i.e., the $\overline{MIA_1}$—$\overline{MIA_{128}}$ and $\overline{MOA_1}$—$\overline{MOA_{128}}$) are monitored by the comparator. The comparator of FIG. 20 will be seen to include the usual combination of NAND and NOR gates terminating in the output NAND gates 4B1 and 4B2 with the output lead 4B1/2 therefrom being connected to the NAND gate 7C3 of FIG. 19.

The memory address control register of FIG. 13 includes the JK flip-flops 10B1—10B5 and 11B1—11B5 together with an end-of-memory address flip-flops 7D4. Data bits read from the memory (as indicated in FIG. 17) and applied to the buffers 4A2—4A8 and 5A4—5A2 (FIG. 17) are gated into the MACR (FIG. 13) via the NAND input gates 16B6—16B10, 13A9, 13A10, 14A9, 14A10. These last-mentioned gates as well as flip-flops 11B5 are controlled through the buffer 20B7 by the "load MACR" signals applied to buffer 20B7 from the gate 11D2 of FIG. 10C. Advance signals for the MACR of FIG. 13 are applied from gates 8D4 and 12D6 of FIGS. 10B and 10C to the NOR gate 12B1 which in turn is coupled to each of the JK flip-flops of FIG. 13 by the buffer 5B5. The MACR is reset by a signal from gate 11D1 of FIG. 10C applied via NOR gate 12B2 and buffer 5B6 of FIG. 13 as well as from the reset flip-flop 7D1 of FIG. 10A.

FIGS. 18, 19, 21 and 22 show the timing and logic controls associated with one embodiment of the invention wherein the B section output is recorded by a conventional incremental magnetic tape recorder. To distinguish the counter and output sequence control associated with outputting of data, from the input sequence control previously described, the output sequencer of FIG. 18 is referred to as the "TS counter" and is seen to provide the output timing signals TS which are used primarily in the output control logic of FIG. 19.

It will be seen that the output sequencer or "TS" counter of FIG. 18 includes six JK flip-flops 15C4 and 13C1—13C5 having the indicated output leads for providing the plurality of output timing signals "$TS_1$" et seq. The input gates 12C1 and 12C2 together with the inverters 11C2 and 11C3 and the additional input inverter 8C10 provide control of the TS counter using primarily the output control signals from the output control logic diagram of FIG. 19.

In FIG. 19 the timing signals from FIG. 18 are shown as being applied at various points to the indicated NAND and NOR gates as well as to the "D" bit flip-flop 15C1 and the interrecord gap control flip-flop 15C3. It will also be seen from FIG. 19 that the output of data is under the control of the master clock for the purposes described earlier. For purpose of illustration the "single space"-"double space" control switch is shown in FIG. 19 as controlling NAND gates 9C2 and 9C3, which in turn control the setting of the data output register of FIG. 17 so that single space or double space control signals will be recorded on the output tape (or applied to the typewriter or printer directly during online printing).

The character counter of FIG. 21 includes the JK flip-flops 1B1—1B5 and 2B1—2B3 with the counter being advanced by the advance signals from gate 10C5 of FIG. 19. Resetting of the character count as well as of the output flip-flop 15C2 thereof is under the control of the input gate 10C9 and inverter 5B7. As seen in FIG. 19 the character counter reset is controlled by gate 10C8. The master reset from the master control logic diagram of FIG. 10A also provides an input control lead for the character counter. For purpose of illustration the system is shown with character counter of FIG. 21 set to provide an indication when the 65 location in a given line has been filled. After the count of 65 has been reached, the output is then monitored for the next following space code in the manner described earlier. The space code next following a count of 65 then causes an IR gap delay signal to be provided. Assuming a system wherein an 80 character line is being provided it will be seen that 15 character spaces will be permitted following the count of 65 before a carriage return or IR gap signal is forced. If an end of word (or space code) does not occur by the time a count of 80 is reached, the circuit of FIG. 21 generates an end of count (EOC) signal and the IR gap delay signal is provided by the circuit of FIG. 22A. Gate 766 of FIG. 19 will be seen to provide the control over the circuit of FIG. 22A.

Turning to FIG. 22, a delay signal generator is illustrated which provides certain delay signals which are used in conjunction with readout from the B memory section to a tape recorder. With the indicated incremental tape recorder the record density is 200 bits per inch with a recording speed of 200 bits per second. In order to permit adequate time for physical movement of the tape the circuit of FIG. 22 therefore provides a 5-millisecond delay signal each time a character is recorded. When the end of a given line is reached an interrecord gap delay signal (or IR delay) is provided by the circuit of FIG. 22A to gate 10C10 of FIG. 19. The line driver 15D1 of FIG. 19 receives this signal via inverter 3C4 and applies a control signal via output line 15D1/2 to the tape unit. The tape recorder is therefore caused to undergo approximately three-fourths of an inch of tape feed. In the case of a typewriter the IR gap delay signal is used to signify a carriage return operation. The specific times will of course be adjusted in accordance with the physical capabilities of the particular recording equipment.

Various types of special line formatting operations can also be controlled by adjusting the character counter and the delay circuits of FIGS. 22 and 22A so that the output equipment, whether a recorder of the magnetic tape type or whether a printout device such as a typewriter or line printer, will undergo whatever action is desired. For example it has been described above how the "D" bit is monitored so that a special function or operation will result. In the particular example the occurrence of a "1" in the "D" bit location (FIG. 17, gate 4B5) controls flip-flop 15C1 of FIG. 19 in a manner such that an operator controlled new line request is carried out. This is further illustrated in the timing diagram of FIG. 26 wherein the "D" bit is shown as going true at the time of a character count of 30.

Figure 23:
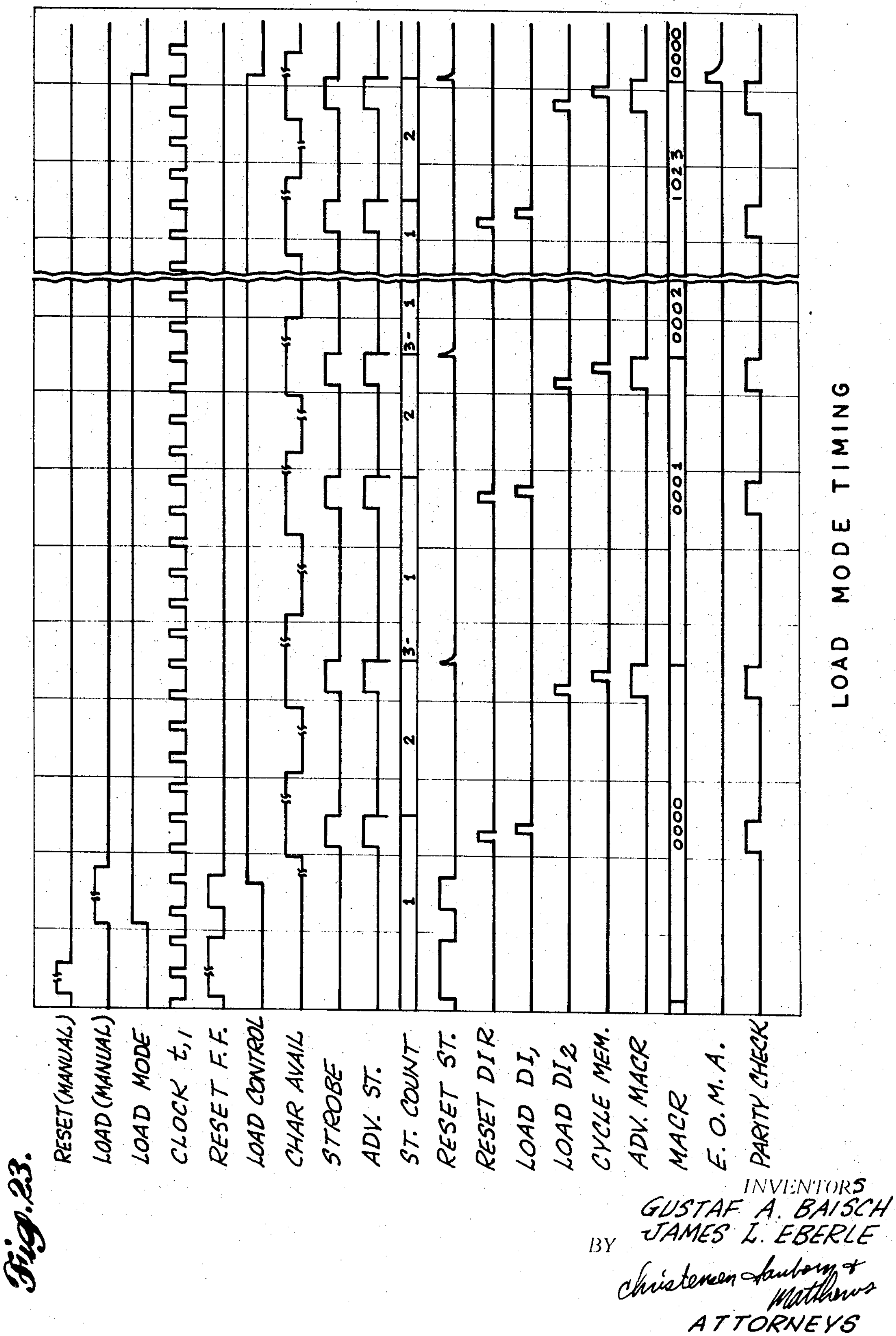

In FIG. 23 the time of occurrence of the various signals for loading the memory with input data from the memory loading tape is illustrated. While the repetition rate of the clock pulse signals $t_1$ can be selected in accordance with desired system speed, for purpose of illustration the clock pulse signals in FIG. 23 are shown as being 1 millisecond wide with a pulse starting every 4 microseconds. As previously described and as seen from FIG. 23, the operation of the manual reset switch or operation of the load mode switch causes the reset flip-flop of FIG. 10A to come into operation and reset the various circuits described above. The load mode and load control flip-flops are also operated so that when the character available signal from the tape input unit (FIG. 16) occurs the strobe and advance ST signals will start. The data input register (DIR) will be reset and loading of the various memory locations will take place.

As described earlier the system is shown as making use of ten-bit storage locations in the memory with a conventional seven channel tape input unit being used for loading the memory. While a ten channel tape unit could be utilized it is evident that certain economic advantages are achieved by utilizing a seven channel unit. Thus in the system illustrated by the detailed logic diagrams two seven-bit words are read from the tape input unit for loading each ten-bit memory word.

For purposes of explanation and identifying the various bits in the two words reference will be made to the diagrams of FIGS. 16A and 16B. There it will be seen that the first word from the tape input unit includes the seven bits identified as the "C,D,E,F, O,O,P" bits. The second word from the load tape has the bits identified as the "1,2,4,8,A,B,P" bits. The P bit is the most significant bit and represents even parity. The parity bit for the second word is associated with a character code and is always carried through the system with the character. The parity bit for the first word is used only for purposes of checking parity during loading of the memory and is then discarded as will be evident from the manner of operation of the data input register of FIG. 16. The control codes are contained in the first word and the actual character code is contained in the second word, or as mentioned above the two words may be combined directly to form a ten-bit memory address. In FIG. 16B the bits from the two words used for making a ten-bit character word are shown as including the 1,2,4,8,A,B,P bits from the second word of FIG. 16A plus the D,E,F bits of FIG. 16A. The composite C zone address word is shown as including the 1,2,4,8,A,B bits of the second word plus the C,D,E,F bits of the first word. As previously described, the type of information being represented by each pair of input data words are identified by the "F" bit of the first word. If the F bit is false, the data is a character code. If the F bit is true the data is a memory address which will be later read from the A zone and used for accessing the C zone.

Memory section A is loaded with character codes and memory address codes intermixed in accordance with the data on the keys of the keyboard and whether or not a given key represents a character or a multiple string of characters. The memory section B is cleared by initial loading but of course contains character codes for output to the printing or recording apparatus only during operation as the output message string is formed and stored temporarily in this section. The memory section C is loaded with character codes as called for by the various multicharacter keys.

Figure 16A:
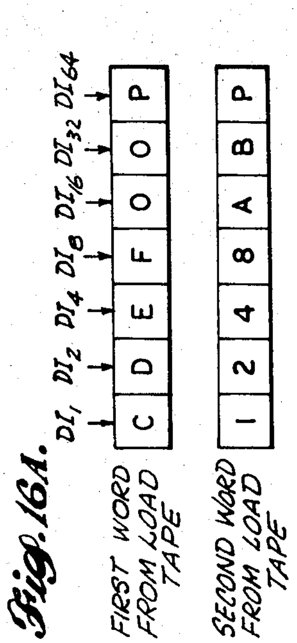
FIG. 16 is a schematic diagram of the data input register and FIG. 16A is a block diagram illustrating the identifications for the "words" read from an input loading tape wherein the first and second "words" of FIG. 16A are combined to provide the composite words of FIG. 16B.
Figure 16B:
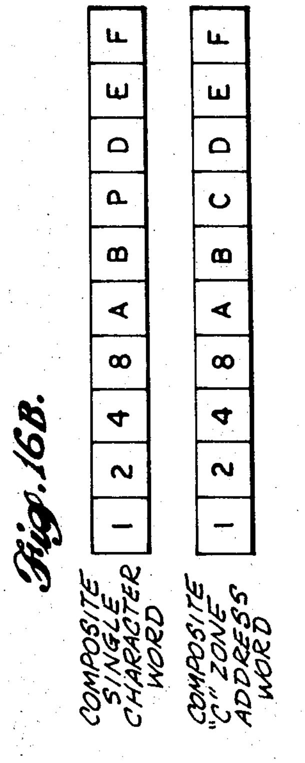

During the loading of a single character into the A zone the C,F,O,0 bits of the first word as shown in FIG. 16A are always "0" (false). The fact that the F bit is false indicates that a single character code follows with the entire character code being contained in the second word. As seen in FIG. 16 the data input lines $DI_1$, $DI_2$, $DI_4$, and $DI_8$ corresponding to the C,D,E,F bits of the first word are the only data input lines gated by the "load $DI_1$" input signal on input lead 8D2/4. Since the C and F bits are zero in the case of a single character being loaded, it will be seen that basically the D and E bits are gated into the data input register from the first word. As seen in FIG. 23 the second input word is then loaded during the ST count of two with the seven bits of the second word indicated in FIG. 16A being loaded. The E bit of the first word is used with all multicharacter data words and must be true for all characters within a multicharacter sequence except for the last character of that sequence. As previously described, having the E bit false in the last character of a multicharacter sequence causes the last character to be added to the output message but then the sequencing for multicharacter operation ends. The E bit is therefore always false for data in memory section A but will either be true or false for data in memory section C, depending upon whether the given character is the last character in a multicharacter string or an intermediate character thereof.

When a given A zone of the memory is being loaded with a C zone address (i.e., corresponding to a multicharacter key on the keyboard) the F bit of the first word of FIG. 16A is true. As seen in FIG. 16 a true F bit from the first word will cause the data input register flip-flop 5C5 to be set to its 1 condition. The output line 5C5/31 of flip-flop 5C5 is applied to the NAND gate 12D2 having data input line DI64 applied thereto. As a result the gate 12D2 will serve to block entry of the P bit to the second word when the composite word is a C zone address as indicated in FIG. 16B. It will be seen that during reading of the first word during loading of a C zone address into the A zone that the C bit of the first word will be applied through gate 2C8 to the data input register flip-flop 5C2 and thus form part of the address being stored in the A zone. The flip-flop 5C2 of the data input register thus either represents the parity bit for an A zone character or forms part of the C zone address being stored in the A zone.

Figure 24:
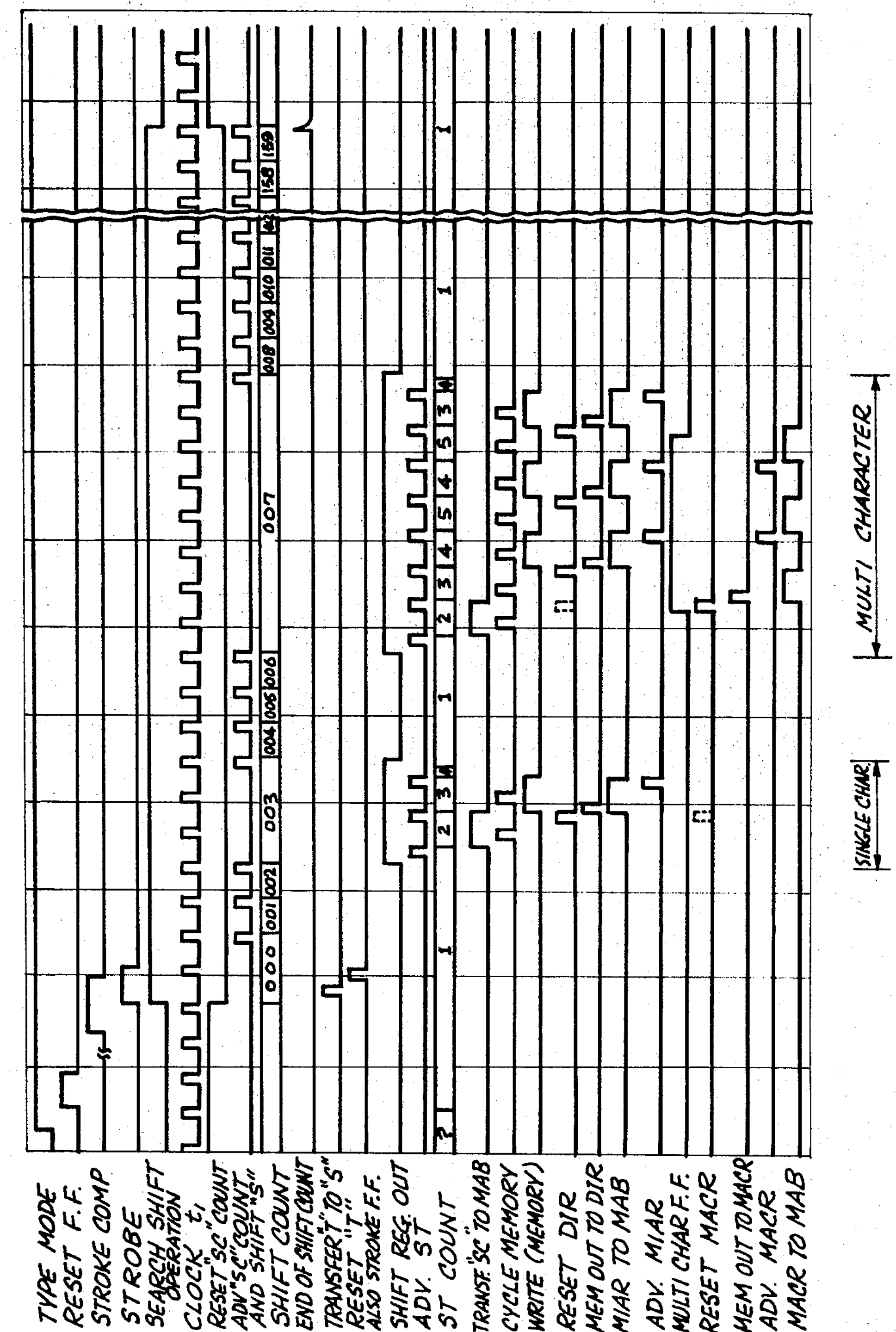

FIG. 24 is a timing diagram for the Type mode, and reference to it shows that when the Type mode switch is operated the reset flip-flop 154 serves to reset the various gates and registers. When the stroke complete signal occurs the strobe circuit permits the next following clock pulse to start the search shift operation. The count and shift operation continues so long as the output stage of the "S" register is zero, but when the output stage goes to a "1" the ST counter changes from "1" to "2". The SC count is then transferred to the memory address buffer so that during the ensuing read/restore cycle zone A is interrogated. The data input register will be seen to be reset so that the character read from the A zone will be sent to the DIR and then written in the B zone during the write cycle. The first "cycle memory" pulse reads the data from A zone, and the second "cycle memory" pulse results in the read-in to B zone. The next clock pulse then serves to advance the memory input address register. The ST counter goes briefly to a "4" count but then at the start of the next clock pulse the ST counter resets to "1" and the search shift operation continues. During count times 4, 5 and 6 of the shift counter it is assumed that there is no character to be read into the output zone.

At the time when the shift counter is going to a "7" condition it will be seen that the shift register output has assumed a "1" condition and an advance ST signal is applied to the ST counter. Again the SC count is transferred to the memory address buffer and the selected location of the A zone is read. However, at this time the "F" bit of that A zone is detected as being true and the multicharacter flip-flop is set. The C zone of the memory is therefore accessed using the address read from the A zone and the data therein read into the B zone. With the multicharacter flip-flop set the ST counter counts to "5" and then continues to alternate between a 5 and a 4 condition so long as the multicharacter flip-flop (FIG. 10C) is set. As described above the "E" bit of the C zone is monitored and controls the MC flip-flop so that it remains set until the last character of the string has been read from the C zone. When the MC resets the ST counter then goes from a "5" count to a "3" count and the cycle is completed in the same manner as described above for the single character being read into the B zone. The particular system illustrated has a capacity such that when a count of 159 is reached by the shift counter and end-of-shift count signal is generated and the system is in condition for receiving a further stroke.

Figure 25A:
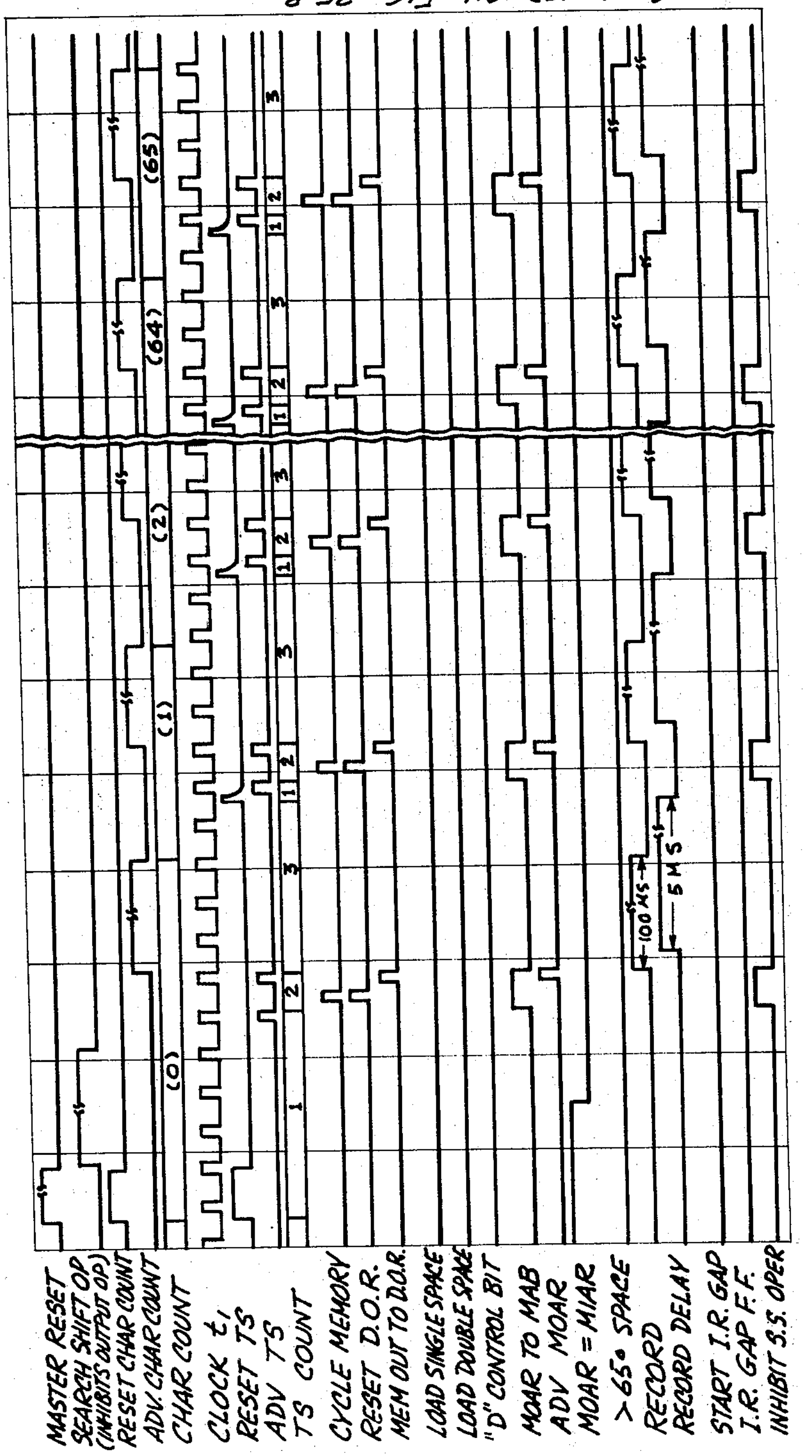
Figure 25B:
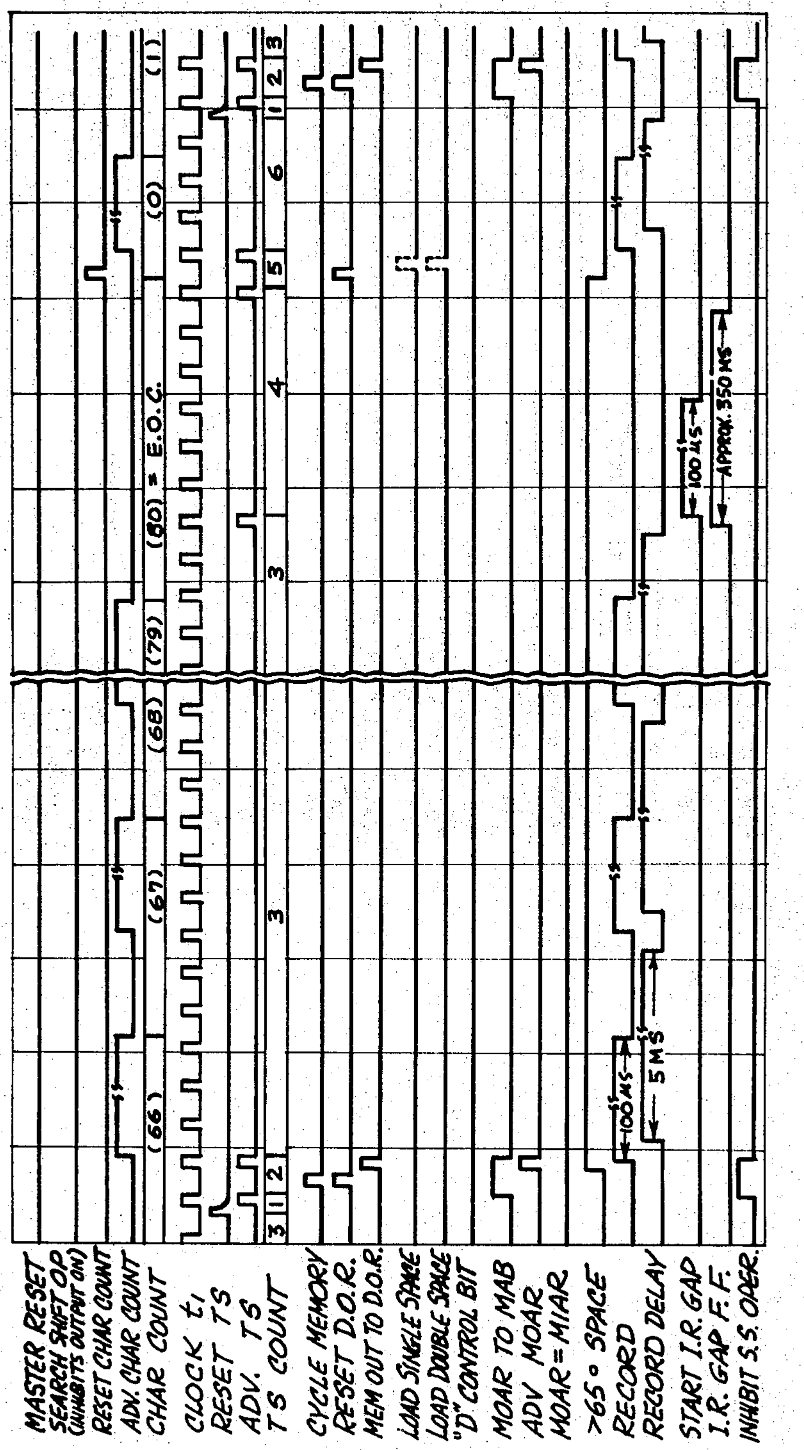
Figure 26:
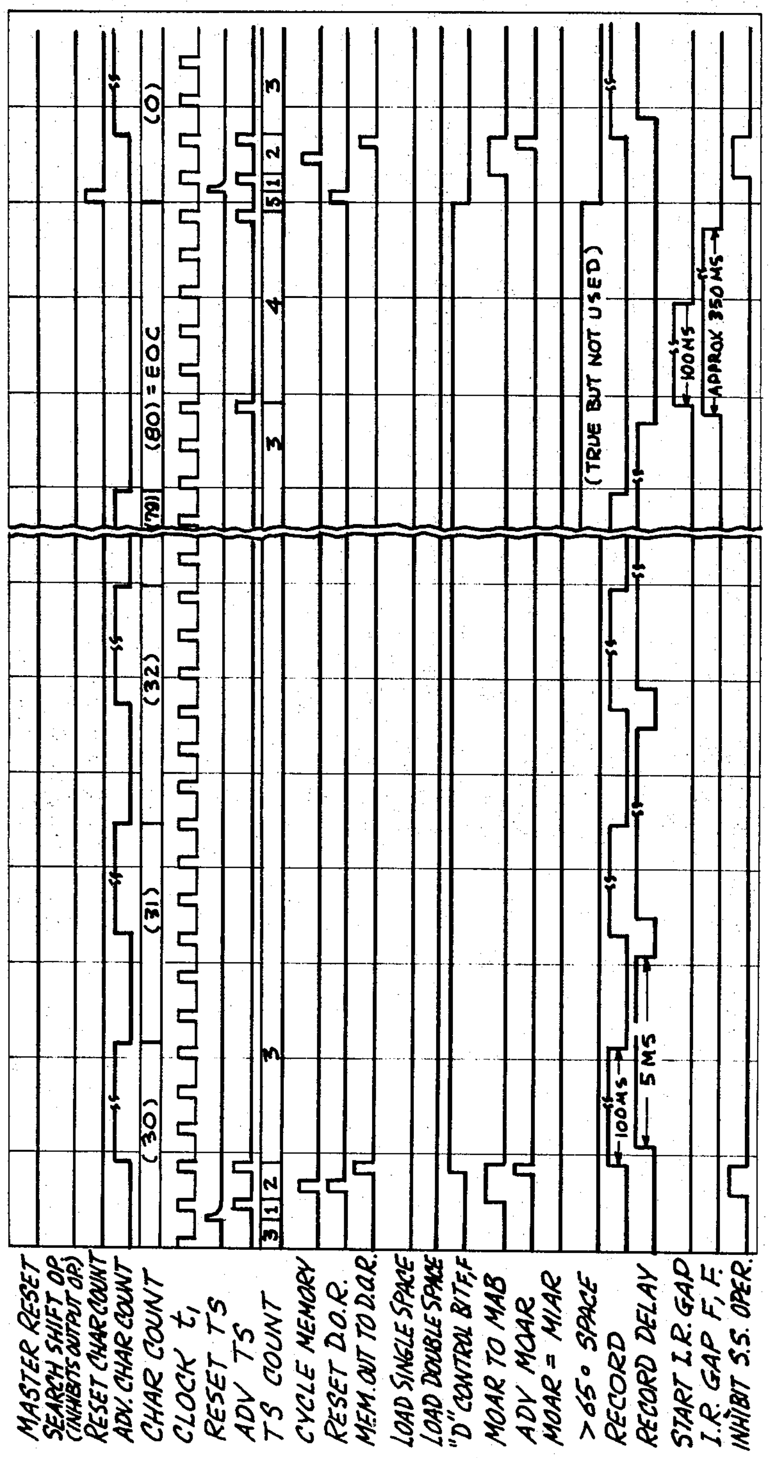

FIGS. 25A and 25B together form a timing diagram showing the manner in which data is read out of the B zone of the memory. As described above the search shift operation has preference over the outputting of data from the B zone and thus the timing diagram shows the output starting only after the search shift operation signal of FIG. 10C which inhibits output operation has terminated. As seen in FIGS. 25A, 18, and 10A the inverter 8C16 of the TS counter inhibits search shift operations while the memory is being cycled for readout from the B section. This is seen to be a very short time interval and thus keyboard operation is virtually free from interruption by the outputting of data from the B section. In FIGS. 25A and 25B it is assumed that the D bit remained false and therefore the system starts looking for a space signal after the character counter has reached a count of 65 (FIG. 26B). If one is received after a count of 65 but before a count of 80 the remainder of the line will be filled with space codes and then following a count of 80 the IR gap signal is applied to the output recorder (and a carriage return signal to the typewriter if it is in operation). The single space or double space control signal will be provided to the recorder or typewriter depending on the setting of the control switch therefor. If no space signal is read from the B zone by the time a count of 80 is reached the IR gap output signal, etc., will occur in the manner indicated and the word then being formed is continued on the next line. As seen in FIG. 26 a true "D" bit at the count of 30 causes the remainder of the line to be filled with blanks or spaces (finish line routine) with the interrecord gap signal and/or the typewriter carriage return signal being provided at the count of 80. In loading the memory a "true" D bit in the first word (FIG. 16A) is always accompanied by a space character code in the second word.

There has been disclosed an improved keyboard input-record output machine having capabilities not to be found in the art, and which makes possible "real time" verbatim reporting. While the invention has been disclosed by reference to presently preferred embodiments, it will be evident to those skilled in the art that modifications and changes can be made without departing from the inventive concepts. It is therefore intended that such modifications will be encompassed by the following claims.

We claim:

1. A stenographic signal generating system comprising in combination: a keyboard unit having a plurality of individually and simultaneously operable keys, said keys including in left-to-right sequence across the keyboard a first group of multicharacter keys each representing a first plurality of characters, a second group of single character keys each representing a single character, and a third group of multicharacter keys each representing a second plurality of characters; and keyboard scanning and signal generating means coupled with said keyboard and operative to provide in serial fashion a string of electrical character signals representing each of the characters of each operated key and including sequence control means controlling the sequence of the output of character signals such that the signals representing the characters of the keys in said first group are provided first, those of the keys in said second group are provided second, and those of the third group are provided last.

2. The system of claim 1 wherein said first group of keys includes a plurality of keys each representing at least one complete word and said generating means generates in sequence each of the characters of each complete word in response to operation of a single key.

3. The system of claim 1 wherein said keyboard scanning and signal generating means scans each of said group of keys in a left-to-right and top-to-bottom scan pattern such that the leftmost keys are scanned first and the uppermost key of any two keys having substantially the same horizontal position is scanned before a lower key.

4. The system of claim 1 wherein said keyboard unit includes switch means associated with each key and settable from a first to a second condition in response to the operation of a key, and said scanning and signal generating means includes keyboard monitoring means coupled with said switch means and providing a start signal when all of the operated keys have been released, signal memory means having signals stored therein representing each of the characters of said keys, and means sequentially reading the character signals from said memory means.

5. The system of claim 4 wherein said scanning means scans said keys in sequential top-to-bottom scans starting at the left side of the keyboard.

6. The system of claim 4 wherein said keyboard includes a fourth group of single character keys located below said second group of keys and each representing a vowel.

7. The system of claim 6 wherein said fourth group of keys includes two keys for each vowel.

8. The system of claim 4 wherein each key of said first group represents a word prefix and wherein each key of said third group represents a word suffix.

9. A system for generating output signals representative of alpha characters arranged in proper sequence in response to the parallel operation of a plurality of alpha input keys comprising in combination: a keyboard including a plurality of input keys all of which are simultaneously operable and including a first plurality of multicharacter keys each of which includes thereon a representation of a plurality of alpha characters and a second plurality of single character keys each having a representation of an alpha character thereon; key switch means coupled with each of said keys and responsive to the operation thereof; switch scanning means coupled with said key switch means and providing output signals in a sequence determined by which keys had been operated; and character signal generating means coupled with said scanning means and responsive to said output signals to provide a sequence of character signals representing each character of each operated key.

10. The system of claim 9 including a plurality of word control keys, and wherein said character signal generating means provides a string of character signals in sequence defining a plurality of words in response to a signal from said scanning means identifying a word control key as having been operated.

11. The system of claim 9 wherein said character signal generating means includes a signal counter and means for changing the count thereof in synchronism with the scanning of said switches, and means controlled by said scanning means gating said counter to provide an output signal representing the count of the counter in response to said scanning means detecting an operated key switch.

12. The system of claim 9 wherein said scanning means is connected to scan said keys in a plurality of top-to-bottom scan cycles starting with the leftmost keys and progressing to the right.

13. The system of claim 9 including a signal memory unit having signals stored therein representing each of the characters associated with each of said keys, and memory accessing readout control means connected to said scanning means and to said memory unit to cause readout of character signals from said memory unit in accordance with signals from said scanning means identifying an operated key.

14. The system of claim 13 wherein said signal generating means includes a signal counter connected to said scanning means and to said memory unit and operative to cause character signals to be selectively read from said memory unit, the count of said counter serving as a memory access address.

15. The system of claim 13 including second memory means coupled with said memory unit and operative to store in sequence the character signals read from said memory unit, and readout means connected to said second memory means for selectively reading the stored character signals therefrom.

16. The system of claim 13 including printing means, and means connecting said memory unit with said printing means to provide printing control signals thereto representing the characters to be printed.

17. The system of claim 9 wherein said keyboard includes a space key and wherein said space key is the last key scanned by said switch scanning means.

18. The apparatus of claim 9 including keyboard monitor means coupled with said key switch means and with said scanning means and responsive to the operation of one or more of said keys and the subsequent release of all keys to initiate operation of said scanning means.

19. The apparatus of claim 12 wherein each key in said first plurality of keys represents a word prefix, and a third plurality of multicharacter keys each representing a word suffix.

20. The apparatus of claim 18 wherein said single character keys include at least one key for each letter of the alphabet and a plurality of keys for a plurality of letters of the alphabet.

21. The apparatus of claim 19 wherein said second plurality of single character keys includes first and second groups of vowel keys respectively adjacent said prefix and suffix keys, a group of consonant keys intermediate said groups of vowel keys, and a third group of vowel keys intermediate said first and second groups of vowel keys and below said consonant keys, and wherein said scanning means is connected to scan said first group prior to said consonant keys, then scans said consonant keys, said third group, and said second group in that order.

22. The apparatus of claim 9 wherein said scanning means and said signal generating and memory means includes electronic digital signal generating and memory means providing output electric signals sequentially representative of the characters represented by the keys operated prior to initiation of operation of said scanning means.

23. The apparatus of claim 13 wherein said memory unit has a first section having stored therein signals representing the characters of each said single character key and having stored therein multicharacter key memory address signals for each of said multicharacter keys, and a second section having stored therein signals representing each of the characters of said multicharacter keys; and means coupled with said scanning means and said memory unit and responsive to the reading of a memory address signal from said first section to interrupt operation of said scanning means and to cause the sequential reading from said second section the signals representing the characters of the multicharacter key whose address was read from said first section.

24. The apparatus of claim 23 wherein said last-named means includes signal monitoring means coupled with the output of said first section of said memory unit, wherein said memory unit has a plurality of binary bit storage locations for each character and for each address stored therein, and wherein one of the bits associated with each multicharacter key memory address stored in said first section is monitored by said monitoring means for identifying memory address signals read from said first section.

25. The apparatus of claim 24 wherein said scanning means includes a multistage binary shift register coupled with said key switch means, a binary counter, means applying a shift signal to said register and a count signal to said counter at substantially the same rate, and means responsive to a predetermined output of said register and the count of said counter to access said memory unit using the count of said counter as the memory address.

26. The apparatus of claim 25 including printing means coupled with said memory unit and operative to print each character represented by an operated key in response to character signals read from said memory unit.

27. A data transcription system comprising in combination: a parallel-stroke keyboard having a plurality of individually operable keys thereon with each of said keys being adapted for depression simultaneously with the depression of other keys in parallel-stroke fashion, said keys including a first group of prefix keys representing word prefixes, a second group of character keys representing individual characters, and a third group of suffix keys; signal-generating means coupled with each of said keys and responsive to the operation of an associated key to provide an output signal indicating operation of the associated key; keyboard-stroke monitor means coupled with said keyboard and providing an output signal after one or more of the keys on the keyboard has been operated and each of the operated keys has then been released; keyboard-scan means coupled with said signal means and said monitor means and responsive to said keyboard-stroke monitor means to scan said signal means in a predetermined sequence to provide sequential output signals identifying each operated key; character signal generating means coupled with said scan means and responsive to the receipt of a signal representing an operated key to provide output character signals in sequence corresponding to the alpha designations of the keys operated; and signal-recording means coupled with said storage and generating means for recording character data in the sequence of the output signals provided thereto by said generating means.

28. A data transcription system for permitting an operator to operate a plurality of keys representing the phonetic spelling of words using prefixes, consonants, vowels, and suffixes wherein the keys are operated in parallel-stroke fashion, comprising in combination: a keyboard having a plurality of prefix keys each having designations thereon representing word prefixes including a plurality of alpha characters; a plurality of individual character keys each having an alpha designation therein representing a single character, and a third plurality of keys each having a plurality of alpha designations thereon corresponding to word suffix letter groupings; key switch means responsive to the operation of each of said keys to provide an output signal indicating that the associated key has been operated; keyboard-monitoring means connected to said keys and responsive to the operation of any key to provide a start signal when all of the keys have been released following operation of any key; keyboard-scan means coupled with said monitor means and with said keyboard-switch means for scanning said keyboard switches in a predetermined sequence and to provide an output signal designation uniquely identifying each operated key; signal storage means having a plurality of signal storage locations therein with each location having signals stored therein corresponding to a character identified on a key top; signal storage accessing and control means coupled with said storage means and with said scan means and responsive to receipt of said key identification signals to interrogate said storage means and to cause the sequential reading from said storage means of the character signals corresponding to the alpha designations on the operated keys, the sequence of signals read from said storage means corresponding to the scan sequence determined by said scan means, said accessing and control means including signal means for repeatedly sequentially interrogating a selected zone of said storage means in response to a single signal from said scan means representing a prefix or suffix key with said sequential interrogation of the storage means continuing until there has been read from the selected zone each of the character signals corresponding to each of the characters on the operated key; and recording means coupled with said storage means and responsive to the signals therefrom to sequentially record character data corresponding to the characters of the operated keys.

29. The system as defined in claim 28 wherein said keyboard includes a space key and said scan means is connected to scan said space key as the last key in the scan sequence.

30. The system of claim 28 wherein said keyboard includes a plurality of word keys each representing one or more complete words, wherein said storage means has the signals representing each of the characters of each of the words associated with each word key stored in adjacent storage locations, and wherein said storage accessing and control means causes the readout from said storage means of each of the characters of each word of an operated multiple word key in response to a signal from said scan means identifying a multiple word key as such.

31. The system of claim 30 wherein said control means includes means interrupting the operation of said scan means when more than one character is to be read from said storage means in response to the operation of a single key.